(12) United States Patent
Wilcenski et al.

(10) Patent No.: US 9,798,072 B2
(45) Date of Patent: Oct. 24, 2017

(54) OPTICAL ELEMENT AND METHOD OF FORMING AN OPTICAL ELEMENT

(71) Applicant: Cree, Inc., Durham, NC (US)

(72) Inventors: Steve Wilcenski, Cary, NC (US); Kurt S. Wilcox, Libertyville, IL (US); Theodore Lowes, Lompoc, CA (US)

(73) Assignee: Cree, Inc., Durham, NC (US)

( * ) Notice: Subject to any disclaimer, the term of this patent is extended or adjusted under 35 U.S.C. 154(b) by 0 days.

(21) Appl. No.: 14/839,557

(22) Filed: Aug. 28, 2015

(65) Prior Publication Data

US 2015/0370000 A1 Dec. 24, 2015

Related U.S. Application Data

(63) Continuation-in-part of application No. 14/577,730, filed on Dec. 19, 2014, now abandoned, and a continuation-in-part of application No. 14/472,078, filed on Aug. 28, 2014, now abandoned, and a continuation-in-part of application No. 13/842,521, filed on Mar. 15, 2013, now Pat. No. 9,519,095, and a continuation-in-part of application No. 13/839,949, filed on Mar. 15, 2013, now Pat. No. 9,581,751, and a continuation-in-part of application No. 13/841,074, filed on Mar. 15, 2013, now Pat. No. 9,625,638, and a continuation-in-part of application No. 13/841,622, filed on Mar. 15, 2013, and a continuation-in-part of application No. 13/840,563, filed on Mar. 15, 2013, and a continuation-in-part of application No. 13/938,877, filed on Jul. 10, 2013, now Pat. No. 9,389,367, and a continuation-in-part of application No. 14/015,801, filed on Aug. 30, 2013, now Pat. No. 9,291,320, and a continuation-in-part of application No. 14/101,086, filed on Dec. 9, 2013, now Pat. No. 9,690,029, and a continuation-in-part of application No. 14/101,132, filed on Dec. 9, 2013, now Pat. No. 9,442,243, and a continuation-in-part of application No. 14/101,147, filed on Dec. 9, 2013, and a (Continued)

(51) Int. Cl.
*F21V 8/00* (2006.01)
*F21Y 105/00* (2016.01)
*F21Y 115/10* (2016.01)

(52) U.S. Cl.
CPC .......... *G02B 6/0065* (2013.01); *G02B 6/005* (2013.01); *G02B 6/0033* (2013.01); *F21Y 2105/00* (2013.01); *F21Y 2115/10* (2016.08)

(58) Field of Classification Search
CPC .... G02B 6/0033; G02B 6/004; G02B 6/0043; G02B 6/0065
See application file for complete search history.

(56) References Cited

U.S. PATENT DOCUMENTS

| 615,108 A | 11/1898 | De Segundo |
| 766,515 A | 8/1904 | Northrup |

(Continued)

*Primary Examiner* — Daniel Petkovsek
(74) *Attorney, Agent, or Firm* — McCracken & Gillen LLC

(57) ABSTRACT

According to one aspect, an optical waveguide comprises a waveguide body exhibiting total internal reflection, a substrate, and a plurality of light extraction features disposed on a surface of the substrate. The light extraction features are non-adhesively bonded to the waveguide body or may be disposed on opposing sides of the substrate. A method of forming an optical element is also disclosed.

9 Claims, 20 Drawing Sheets

Related U.S. Application Data continuation-in-part of application No. 14/101,129, filed on Dec. 9, 2013, and a continuation-in-part of application No. 14/101,051, filed on Dec. 9, 2013, now Pat. No. 9,366,396, and a continuation-in-part of application No. PCT/US2014/013937, filed on Jan. 30, 2014, and a continuation-in-part of application No. PCT/US2014/013931, filed on Jan. 30, 2014, and a continuation-in-part of application No. PCT/US2014/030017, filed on Mar. 15, 2014, and a continuation-in-part of application No. 14/472,064, filed on Aug. 28, 2014, and a continuation-in-part of application No. 14/472,035, filed on Aug. 28, 2014, now Pat. No. 9,645,303, and a continuation-in-part of application No. 14/801,476, filed on Jul. 16, 2015, now abandoned.

(56) References Cited

U.S. PATENT DOCUMENTS

| | | |
|---|---|---|
| D67,806 S | 7/1925 | Hoyt et al. |
| 2,043,951 A | 6/1936 | Eksergian |
| 2,992,587 A | 4/1958 | Hicks, Jr. et al. |
| 3,372,740 A | 3/1968 | Kastovich et al. |
| 3,532,871 A | 10/1970 | Shipman |
| D219,546 S | 12/1970 | Kaiser et al. |
| 4,146,297 A | 3/1979 | Alferness et al. |
| 4,441,787 A | 4/1984 | Lichtenberger |
| 4,685,766 A * | 8/1987 | Nishimura ............ G02B 6/032 362/556 |
| 4,714,983 A | 12/1987 | Lang |
| D298,861 S | 12/1988 | Ewing et al. |
| 4,914,553 A | 4/1990 | Hamada et al. |
| 4,954,930 A | 9/1990 | Maegawa et al. |
| 4,977,486 A | 12/1990 | Gotoh |
| 5,005,108 A | 4/1991 | Pristash |
| 5,009,483 A | 4/1991 | Rockwell, III |
| 5,026,161 A | 6/1991 | Werner |
| 5,040,098 A | 8/1991 | Tanaka et al. |
| 5,047,761 A | 9/1991 | Sell |
| 5,061,404 A | 10/1991 | Wu et al. |
| 5,097,258 A | 3/1992 | Iwaki |
| 5,106,181 A * | 4/1992 | Rockwell, III ...... G02B 6/0026 385/1 |
| 5,113,177 A | 5/1992 | Cohen |
| 5,113,472 A | 5/1992 | Gualtieri et al. |
| 5,171,080 A | 12/1992 | Bathurst |
| 5,175,787 A | 12/1992 | Gualtieri et al. |
| 5,186,865 A | 2/1993 | Wu et al. |
| 5,245,689 A | 9/1993 | Gualtieri |
| 5,253,317 A | 10/1993 | Allen et al. |
| 5,295,019 A | 3/1994 | Rapoport |
| 5,309,544 A | 5/1994 | Saxe |
| 5,359,687 A | 10/1994 | McFarland |
| 5,359,691 A | 10/1994 | Tai et al. |
| 5,396,350 A | 3/1995 | Beeson et al. |
| 5,398,179 A | 3/1995 | Pacheco |
| 5,400,224 A | 3/1995 | DuNah et al. |
| 5,428,468 A | 6/1995 | Zimmerman et al. |
| 5,461,547 A | 10/1995 | Ciupke et al. |
| 5,462,700 A | 10/1995 | Beeson et al. |
| 5,481,385 A | 1/1996 | Zimmerman et al. |
| 5,506,924 A | 4/1996 | Inoue |
| 5,521,725 A | 5/1996 | Beeson et al. |
| 5,521,726 A | 5/1996 | Zimmerman et al. |
| 5,528,720 A | 6/1996 | Winston et al. |
| 5,537,304 A | 7/1996 | Klaus |
| 5,541,039 A | 7/1996 | McFarland et al. |
| 5,548,670 A | 8/1996 | Koike |
| 5,553,092 A | 9/1996 | Bruce et al. |
| 5,555,109 A | 9/1996 | Zimmerman et al. |
| 5,555,160 A | 9/1996 | Tawara et al. |
| 5,555,329 A | 9/1996 | Kuper et al. |
| 5,572,411 A | 11/1996 | Watai et al. |
| 5,577,492 A | 11/1996 | Parkyn, Jr. et al. |
| 5,584,556 A | 12/1996 | Yokoyama et al. |
| 5,598,280 A | 1/1997 | Nishio et al. |
| 5,598,281 A | 1/1997 | Zimmerman et al. |
| 5,613,751 A | 3/1997 | Parker et al. |
| 5,613,770 A | 3/1997 | Chin, Jr. et al. |
| 5,624,202 A | 4/1997 | Grierson |
| 5,657,408 A | 8/1997 | Ferm et al. |
| 5,658,066 A | 8/1997 | Hirsch |
| 5,659,410 A | 8/1997 | Koike et al. |
| 5,676,453 A | 10/1997 | Parkyn, Jr. et al. |
| 5,676,457 A | 10/1997 | Simon |
| 5,677,702 A | 10/1997 | Inoue et al. |
| 5,685,634 A | 11/1997 | Mulligan |
| 5,696,865 A | 12/1997 | Beeson et al. |
| 5,702,176 A | 12/1997 | Engle |
| 5,718,497 A | 2/1998 | Yokoyama et al. |
| 5,727,107 A | 3/1998 | Umemoto et al. |
| 5,735,590 A | 4/1998 | Kashima et al. |
| 5,739,931 A | 4/1998 | Zimmerman et al. |
| 5,748,828 A | 5/1998 | Steiner et al. |
| 5,761,355 A | 6/1998 | Kuper et al. |
| 5,769,522 A | 6/1998 | Kaneko et al. |
| 5,771,039 A | 6/1998 | Ditzik |
| 5,777,857 A | 7/1998 | Degelmann |
| 5,806,955 A | 9/1998 | Parkyn, Jr. et al. |
| 5,812,714 A | 9/1998 | Hulse |
| 5,818,555 A | 10/1998 | Yokoyama et al. |
| 5,839,823 A | 11/1998 | Hou et al. |
| 5,850,498 A | 12/1998 | Shacklette et al. |
| 5,854,872 A | 12/1998 | Tai |
| 5,863,113 A | 1/1999 | Oe et al. |
| 5,872,883 A | 2/1999 | Ohba et al. |
| 5,897,201 A | 4/1999 | Simon |
| 5,914,759 A | 6/1999 | Higuchi et al. |
| 5,914,760 A | 6/1999 | Daiku |
| 5,949,933 A | 9/1999 | Steiner et al. |
| 5,961,198 A | 10/1999 | Hira et al. |
| 5,967,637 A | 10/1999 | Ishikawa et al. |
| 5,974,214 A | 10/1999 | Shacklette et al. |
| 5,997,148 A | 12/1999 | Ohkawa |
| 5,999,281 A | 12/1999 | Abbott et al. |
| 5,999,685 A | 12/1999 | Goto et al. |
| 6,002,079 A | 12/1999 | Shin et al. |
| 6,002,829 A | 12/1999 | Winston et al. |
| 6,007,209 A | 12/1999 | Pelka |
| 6,043,951 A | 3/2000 | Lee |
| 6,044,196 A | 3/2000 | Winston et al. |
| 6,079,838 A | 6/2000 | Parker et al. |
| 6,097,549 A | 8/2000 | Jenkins et al. |
| 6,134,092 A | 10/2000 | Pelka et al. |
| 6,139,163 A | 10/2000 | Satoh et al. |
| 6,139,176 A | 10/2000 | Hulse et al. |
| 6,151,089 A | 11/2000 | Yang et al. |
| 6,155,692 A | 12/2000 | Ohkawa |
| 6,155,693 A | 12/2000 | Spiegel et al. |
| 6,161,939 A | 12/2000 | Bansbach |
| 6,164,790 A | 12/2000 | Lee |
| 6,164,791 A | 12/2000 | Gwo-Juh et al. |
| 6,167,182 A | 12/2000 | Shinohara et al. |
| 6,185,357 B1 | 2/2001 | Zou et al. |
| 6,206,535 B1 | 3/2001 | Hattori et al. |
| 6,231,200 B1 | 5/2001 | Shinohara et al. |
| 6,232,592 B1 | 5/2001 | Sugiyama |
| 6,241,363 B1 | 6/2001 | Lee |
| 6,257,737 B1 | 7/2001 | Marshall et al. |
| 6,259,854 B1 | 7/2001 | Shinji et al. |
| 6,304,693 B1 | 10/2001 | Buelow, II et al. |
| 6,310,704 B1 | 10/2001 | Dogan et al. |
| 6,379,016 B1 | 4/2002 | Boyd et al. |
| 6,379,017 B2 | 4/2002 | Nakabayashi et al. |
| 6,400,086 B1 | 6/2002 | Huter |
| 6,421,103 B2 | 7/2002 | Yamaguchi |
| 6,443,594 B1 | 9/2002 | Marshall et al. |
| 6,461,007 B1 | 10/2002 | Akaoka |
| 6,473,554 B1 | 10/2002 | Pelka et al. |
| 6,480,307 B1 | 11/2002 | Yang et al. |
| 6,485,157 B2 | 11/2002 | Ohkawa |
| 6,508,563 B2 | 1/2003 | Parker et al. |

(56) References Cited

U.S. PATENT DOCUMENTS

| | | |
|---|---|---|
| 6,523,986 B1 | 2/2003 | Hoffmann |
| 6,536,921 B1 | 3/2003 | Simon |
| 6,541,720 B2 | 4/2003 | Gerald et al. |
| 6,554,451 B1 | 4/2003 | Keuper |
| 6,568,819 B1 | 5/2003 | Yamazaki et al. |
| 6,582,103 B1 | 6/2003 | Popovich et al. |
| 6,585,356 B1 | 7/2003 | Ohkawa |
| 6,598,998 B2 | 7/2003 | West et al. |
| 6,612,723 B2 | 9/2003 | Futhey et al. |
| 6,616,290 B2 | 9/2003 | Ohkawa |
| 6,629,764 B1 | 10/2003 | Uehara |
| 6,633,722 B1 | 10/2003 | Kohara et al. |
| 6,634,772 B2 | 10/2003 | Yaphe et al. |
| 6,637,924 B2 | 10/2003 | Pelka et al. |
| 6,647,199 B1 | 11/2003 | Pelka et al. |
| 6,652,109 B2 | 11/2003 | Nakamura |
| 6,659,628 B2 | 12/2003 | Gomez Del Campo |
| 6,671,452 B2 | 12/2003 | Winston et al. |
| 6,676,284 B1 | 1/2004 | Wynne Willson |
| 6,678,021 B2 | 1/2004 | Ohkawa |
| 6,679,621 B2 | 1/2004 | West et al. |
| 6,712,481 B2 | 3/2004 | Parker et al. |
| 6,724,529 B2 | 4/2004 | Sinkoff |
| 6,724,543 B1 | 4/2004 | Chinniah et al. |
| 6,727,965 B1 | 4/2004 | Kubota |
| 6,752,505 B2 | 6/2004 | Parker et al. |
| 6,755,546 B2 | 6/2004 | Ohkawa |
| 6,755,556 B2 | 6/2004 | Gasquet et al. |
| 6,758,582 B1 | 7/2004 | Hsiao et al. |
| 6,775,460 B2 | 8/2004 | Steiner et al. |
| 6,796,676 B2 | 9/2004 | Severtson et al. |
| 6,802,626 B2 | 10/2004 | Belfer et al. |
| 6,802,628 B2 | 10/2004 | Kuo |
| 6,840,656 B2 | 1/2005 | Kuo |
| 6,845,212 B2 | 1/2005 | Gardiner et al. |
| 6,876,408 B2 | 4/2005 | Yamaguchi |
| 6,894,740 B2 | 5/2005 | Ohkawa |
| 6,896,381 B2 | 5/2005 | Benitez et al. |
| 6,924,943 B2 | 8/2005 | Minano et al. |
| 6,971,758 B2 | 12/2005 | Inui et al. |
| 6,974,241 B2 | 12/2005 | Hara et al. |
| 6,992,335 B2 | 1/2006 | Ohkawa |
| 7,008,097 B1 | 3/2006 | Hulse |
| 7,010,212 B2 | 3/2006 | Emmons et al. |
| 7,021,805 B2 | 4/2006 | Amano et al. |
| 7,025,482 B2 | 4/2006 | Yamashita et al. |
| 7,046,318 B2 | 5/2006 | Yu et al. |
| 7,046,905 B1 | 5/2006 | Gardiner et al. |
| 7,063,430 B2 | 6/2006 | Greiner |
| 7,072,096 B2 | 7/2006 | Holman et al. |
| 7,083,313 B2 | 8/2006 | Smith |
| 7,085,460 B2 | 8/2006 | Leu et al. |
| 7,090,370 B2 | 8/2006 | Clark et al. |
| 7,090,389 B2 | 8/2006 | Parker et al. |
| 7,097,341 B2 | 8/2006 | Tsai |
| 7,106,528 B2 | 9/2006 | Ohmori et al. |
| 7,111,969 B2 | 9/2006 | Bottesch et al. |
| 7,118,253 B1 | 10/2006 | Simon |
| 7,131,764 B2 | 11/2006 | Hsu et al. |
| 7,152,985 B2 | 12/2006 | Benitez et al. |
| 7,160,010 B1 | 1/2007 | Chinniah et al. |
| 7,160,015 B2 | 1/2007 | Parker |
| 7,168,841 B2 | 1/2007 | Hsieh et al. |
| 7,175,330 B1 | 2/2007 | Chen |
| 7,178,941 B2 | 2/2007 | Roberge et al. |
| 7,178,946 B2 | 2/2007 | Saccomanno et al. |
| 7,182,480 B2 | 2/2007 | Kan |
| 7,192,174 B2 | 3/2007 | Myoung |
| 7,195,374 B2 | 3/2007 | Saccomanno et al. |
| 7,204,634 B2 | 4/2007 | Chen et al. |
| 7,209,628 B2 | 4/2007 | Winston et al. |
| 7,218,830 B2 | 5/2007 | Iimura |
| 7,222,995 B1 | 5/2007 | Bayat et al. |
| 7,223,004 B2 | 5/2007 | Chen et al. |
| 7,246,931 B2 | 7/2007 | Hsieh et al. |
| 7,258,467 B2 | 8/2007 | Saccomanno et al. |
| 7,265,800 B2 | 9/2007 | Jagt et al. |
| 7,273,299 B2 | 9/2007 | Parkyn et al. |
| 7,290,906 B2 | 11/2007 | Suzuki et al. |
| 7,292,767 B2 | 11/2007 | Cheng |
| 7,322,733 B2 | 1/2008 | Chang et al. |
| 7,364,342 B2 | 4/2008 | Parker et al. |
| 7,369,918 B2 | 5/2008 | Cosgrove |
| 7,393,124 B1 | 7/2008 | Williams |
| 7,399,108 B2 | 7/2008 | Ayabe et al. |
| 7,400,809 B2 | 7/2008 | Erben et al. |
| 7,404,660 B2 | 7/2008 | Parker |
| 7,422,357 B1 | 9/2008 | Chang |
| 7,455,416 B2 | 11/2008 | Chen |
| 7,458,714 B2 | 12/2008 | Chang |
| 7,465,074 B2 | 12/2008 | Blumel |
| 7,486,854 B2 | 2/2009 | Van Ostrand et al. |
| 7,488,093 B1 | 2/2009 | Huang et al. |
| 7,513,672 B2 | 4/2009 | Parker |
| 7,520,650 B2 | 4/2009 | Smith |
| 7,534,013 B1 | 5/2009 | Simon |
| 7,559,672 B1 | 7/2009 | Parkyn et al. |
| 7,566,148 B2 | 7/2009 | Noh et al. |
| 7,566,159 B2 | 7/2009 | Oon et al. |
| 7,581,854 B2 | 9/2009 | Ford |
| 7,614,764 B2 | 11/2009 | Williams et al. |
| 7,626,655 B2 | 12/2009 | Yamazaki et al. |
| 7,628,508 B2 | 12/2009 | Kita et al. |
| 7,635,193 B2 | 12/2009 | Chang |
| 7,635,205 B2 | 12/2009 | Yu et al. |
| 7,639,918 B2 | 12/2009 | Sayers et al. |
| 7,641,363 B1 | 1/2010 | Chang et al. |
| 7,648,256 B2 | 1/2010 | Shiratsuchi et al. |
| 7,654,687 B2 | 2/2010 | Tsai et al. |
| 7,654,719 B2 | 2/2010 | Chang |
| 7,663,804 B2 | 2/2010 | Chang |
| 7,674,018 B2 | 3/2010 | Holder et al. |
| 7,695,165 B2 | 4/2010 | Chang |
| 7,696,531 B2 | 4/2010 | Miyao |
| 7,703,945 B2 | 4/2010 | Leung et al. |
| 7,703,950 B2 | 4/2010 | Ewert et al. |
| 7,703,967 B2 | 4/2010 | Parker |
| 7,710,663 B2 | 5/2010 | Barnes et al. |
| 7,722,224 B1 | 5/2010 | Coleman et al. |
| 7,722,241 B2 | 5/2010 | Chang |
| 7,724,321 B2 | 5/2010 | Hsieh et al. |
| 7,730,967 B2 | 6/2010 | Ballantyne et al. |
| 7,736,019 B2 | 6/2010 | Shimada et al. |
| 7,736,045 B2 | 6/2010 | Yamashita et al. |
| 7,750,982 B2 | 7/2010 | Nelson et al. |
| 7,753,551 B2 | 7/2010 | Yaphe et al. |
| 7,758,227 B1 | 7/2010 | Coleman |
| 7,760,290 B2 | 7/2010 | Kang et al. |
| 7,762,705 B2 | 7/2010 | Sakai et al. |
| 7,766,515 B2 | 8/2010 | Condon et al. |
| 7,771,087 B2 | 8/2010 | Wilcox et al. |
| 7,775,697 B2 | 8/2010 | Hirano et al. |
| 7,776,236 B2 | 8/2010 | Shih et al. |
| 7,780,306 B2 | 8/2010 | Hoshi |
| 7,784,954 B1 | 8/2010 | Coleman |
| 7,798,695 B2 | 9/2010 | Parker |
| 7,806,581 B2 | 10/2010 | Lee |
| 7,810,949 B2 | 10/2010 | Chang |
| 7,810,960 B1 | 10/2010 | Soderman et al. |
| 7,810,968 B1 | 10/2010 | Walker et al. |
| 7,813,131 B2 | 10/2010 | Liang |
| 7,821,982 B2 | 10/2010 | Chen et al. |
| 7,826,698 B1 | 11/2010 | Meir et al. |
| 7,845,826 B2 | 12/2010 | Aylward et al. |
| 7,850,357 B2 | 12/2010 | Kim et al. |
| 7,857,487 B2 | 12/2010 | Wu et al. |
| 7,857,619 B2 | 12/2010 | Liu |
| 7,866,871 B2 | 1/2011 | Couzin et al. |
| 7,905,646 B2 | 3/2011 | Adachi et al. |
| 7,907,804 B2 | 3/2011 | Meir et al. |
| 7,909,496 B2 | 3/2011 | Matheson et al. |
| 7,914,192 B2 | 3/2011 | Coleman |
| 7,914,193 B2 | 3/2011 | Peifer et al. |
| 7,914,196 B2 | 3/2011 | Parker et al. |

(56) References Cited

U.S. PATENT DOCUMENTS

| | | |
|---|---|---|
| 7,929,816 B2 | 4/2011 | Meir et al. |
| 7,934,851 B1 | 5/2011 | Boissevain et al. |
| 7,967,477 B2 | 6/2011 | Bloemen et al. |
| 7,969,531 B1 | 6/2011 | Li et al. |
| 7,970,246 B2 | 6/2011 | Travis et al. |
| 7,976,204 B2 | 7/2011 | Li et al. |
| 7,991,257 B1 | 8/2011 | Coleman |
| 7,997,784 B2 | 8/2011 | Tsai |
| 8,002,450 B2 | 8/2011 | Van Ostrand et al. |
| 8,033,674 B1 | 10/2011 | Coleman et al. |
| 8,033,706 B1 | 10/2011 | Kelly et al. |
| 8,038,308 B2 | 10/2011 | Greiner |
| 8,047,673 B2 | 11/2011 | Santoro |
| 8,047,696 B2 | 11/2011 | Ijzerman et al. |
| 8,052,316 B2 | 11/2011 | Lee |
| 8,054,409 B2 | 11/2011 | Hsieh et al. |
| 8,057,056 B2 | 11/2011 | Zhu et al. |
| 8,061,877 B2 | 11/2011 | Chang |
| 8,064,743 B2 | 11/2011 | Meir et al. |
| 8,067,884 B2 | 11/2011 | Li |
| 8,070,345 B2 | 12/2011 | Zhang et al. |
| 8,075,157 B2 | 12/2011 | Zhang et al. |
| 8,087,807 B2 | 1/2012 | Liu et al. |
| 8,092,068 B2 | 1/2012 | Parker et al. |
| 8,096,671 B1 | 1/2012 | Cronk et al. |
| 8,096,681 B2 | 1/2012 | Fang et al. |
| 8,113,704 B2 | 2/2012 | Bae et al. |
| 8,128,272 B2 | 3/2012 | Fine et al. |
| 8,129,731 B2 | 3/2012 | Vissenberg et al. |
| 8,152,339 B2 | 4/2012 | Morgan |
| 8,152,352 B2 | 4/2012 | Richardson |
| 8,162,524 B2 | 4/2012 | Van Ostrand et al. |
| 8,172,447 B2 | 5/2012 | Meir et al. |
| 8,177,408 B1 | 5/2012 | Coleman |
| 8,182,128 B2 | 5/2012 | Meir et al. |
| 8,186,847 B2 | 5/2012 | Hu et al. |
| 8,189,973 B2 | 5/2012 | Travis et al. |
| 8,192,051 B2 | 6/2012 | Dau et al. |
| 8,198,109 B2 | 6/2012 | Lerman et al. |
| 8,210,716 B2 | 7/2012 | Lerman et al. |
| 8,212,263 B2 | 7/2012 | Bierhuizen et al. |
| 8,218,920 B2 | 7/2012 | Van Ostrand et al. |
| 8,220,955 B2 | 7/2012 | Kwak et al. |
| 8,220,980 B2 | 7/2012 | Gingrich, III |
| 8,226,287 B2 | 7/2012 | Teng et al. |
| 8,231,256 B1 | 7/2012 | Coleman et al. |
| 8,231,258 B2 | 7/2012 | Kim et al. |
| 8,231,259 B2 | 7/2012 | Keller et al. |
| 8,242,518 B2 | 8/2012 | Lerman et al. |
| 8,246,187 B2 | 8/2012 | Cheong et al. |
| 8,246,197 B2 | 8/2012 | Huang |
| 8,249,408 B2 | 8/2012 | Coleman |
| 8,258,524 B2 | 9/2012 | Tan et al. |
| 8,272,756 B1 | 9/2012 | Patrick |
| 8,272,770 B2 | 9/2012 | Richardson |
| 8,277,106 B2 | 10/2012 | Van Gorkom et al. |
| 8,282,261 B2 | 10/2012 | Pance et al. |
| 8,282,853 B2 | 10/2012 | Mori et al. |
| 8,283,354 B2 | 10/2012 | Wilson et al. |
| 8,283,853 B2 | 10/2012 | Yan et al. |
| 8,287,152 B2 | 10/2012 | Gill |
| 8,292,467 B2 | 10/2012 | Vissenberg et al. |
| 8,297,786 B2 | 10/2012 | Shani et al. |
| 8,297,801 B2 | 10/2012 | Coushaine et al. |
| 8,297,818 B2 | 10/2012 | Richardson |
| 8,301,002 B2 | 10/2012 | Shani |
| 8,310,158 B2 | 11/2012 | Coplin et al. |
| 8,314,566 B2 | 11/2012 | Steele et al. |
| 8,317,363 B2 | 11/2012 | Zheng |
| 8,317,366 B2 | 11/2012 | Dalton et al. |
| 8,319,130 B2 | 11/2012 | Lee et al. |
| 8,328,403 B1 | 12/2012 | Morgan et al. |
| 8,328,406 B2 | 12/2012 | Zimmermann |
| 8,331,746 B2 | 12/2012 | Bogner et al. |
| 8,338,199 B2 | 12/2012 | Lerman et al. |
| 8,338,839 B2 | 12/2012 | Lerman et al. |
| 8,338,840 B2 | 12/2012 | Lerman et al. |
| 8,338,841 B2 | 12/2012 | Lerman et al. |
| 8,338,842 B2 | 12/2012 | Lerman et al. |
| 8,344,397 B2 | 1/2013 | Lerman et al. |
| 8,348,446 B2 | 1/2013 | Nakamura |
| 8,348,489 B2 | 1/2013 | Holman et al. |
| 8,351,744 B2 | 1/2013 | Travis et al. |
| 8,353,606 B2 | 1/2013 | Jeong |
| 8,369,678 B2 | 2/2013 | Chakmakjian et al. |
| 8,371,735 B2 | 2/2013 | Chen et al. |
| 8,376,582 B2 | 2/2013 | Catone et al. |
| 8,382,354 B2 | 2/2013 | Kim et al. |
| 8,382,387 B1 | 2/2013 | Sandoval |
| 8,388,173 B2 | 3/2013 | Sloan et al. |
| 8,388,190 B2 | 3/2013 | Li et al. |
| 8,398,259 B2 | 3/2013 | Kwak et al. |
| 8,398,262 B2 | 3/2013 | Sloan et al. |
| 8,408,737 B2 | 4/2013 | Wright et al. |
| 8,410,726 B2 | 4/2013 | Dau et al. |
| 8,412,010 B2 | 4/2013 | Ghosh et al. |
| 8,414,154 B2 | 4/2013 | Dau et al. |
| 8,419,224 B2 | 4/2013 | Wan-Chih et al. |
| 8,430,536 B1 | 4/2013 | Zhao |
| 8,430,548 B1 | 4/2013 | Kelly et al. |
| 8,432,628 B2 | 4/2013 | Shiau et al. |
| 8,434,892 B2 | 5/2013 | Zwak et al. |
| 8,434,893 B2 | 5/2013 | Boyer et al. |
| 8,434,913 B2 | 5/2013 | Vissenberg et al. |
| 8,434,914 B2 | 5/2013 | Li et al. |
| 8,449,128 B2 | 5/2013 | Ko et al. |
| 8,449,142 B1 | 5/2013 | Martin et al. |
| 8,454,218 B2 | 6/2013 | Wang et al. |
| 8,461,602 B2 | 6/2013 | Lerman et al. |
| 8,469,559 B2 | 6/2013 | Williams |
| 8,475,010 B2 | 7/2013 | Vissenberg et al. |
| 8,482,186 B2 | 7/2013 | Wang et al. |
| 8,485,684 B2 | 7/2013 | Lou et al. |
| 8,506,112 B1 | 8/2013 | Dau et al. |
| 8,511,868 B2 | 8/2013 | Haugaard et al. |
| 8,534,896 B2 | 9/2013 | Boonekamp |
| 8,534,901 B2 | 9/2013 | Panagotacos et al. |
| 8,541,795 B2 | 9/2013 | Keller et al. |
| 8,547,022 B2 | 10/2013 | Summerford et al. |
| 8,564,004 B2 | 10/2013 | Tarsa et al. |
| 8,567,983 B2 | 10/2013 | Boyer et al. |
| 8,567,986 B2 | 10/2013 | Szprengiel et al. |
| 8,573,823 B2 | 11/2013 | Dau et al. |
| 8,585,253 B2 | 11/2013 | Duong et al. |
| 8,591,072 B2 | 11/2013 | Shani et al. |
| 8,591,090 B2 | 11/2013 | Lin |
| 8,593,070 B2 | 11/2013 | Wang et al. |
| D695,431 S | 12/2013 | Lay |
| 8,598,778 B2 | 12/2013 | Allen et al. |
| 8,602,586 B1 | 12/2013 | Dau et al. |
| 8,608,351 B2 | 12/2013 | Peifer |
| 8,616,746 B2 | 12/2013 | Shinohara |
| 8,618,735 B2 | 12/2013 | Coplin et al. |
| 8,632,214 B1 | 1/2014 | Tickner et al. |
| 8,641,219 B1 | 2/2014 | Johnson et al. |
| 8,657,479 B2 | 2/2014 | Morgan et al. |
| D702,377 S | 4/2014 | Lay |
| 8,696,173 B2 | 4/2014 | Urtiga et al. |
| 8,702,281 B2 | 4/2014 | Okada et al. |
| 8,724,052 B2 | 5/2014 | Hsieh et al. |
| 8,740,440 B2 | 6/2014 | Mizuno et al. |
| 8,755,005 B2 | 6/2014 | Bierhuizen et al. |
| 8,770,821 B2 | 7/2014 | Ijzerman et al. |
| 8,780,299 B2 | 7/2014 | Ryu et al. |
| 8,833,996 B2 | 9/2014 | Dau et al. |
| 8,833,999 B2 | 9/2014 | Wang et al. |
| 8,840,276 B2 | 9/2014 | Shani et al. |
| 8,851,712 B2 | 10/2014 | Shani et al. |
| 8,864,360 B2 | 10/2014 | Parker et al. |
| 8,870,430 B2 | 10/2014 | Kamikatano et al. |
| 8,870,431 B2 | 10/2014 | Lin et al. |
| 8,882,323 B2 | 11/2014 | Solomon et al. |
| 8,905,569 B2 | 12/2014 | Thomas et al. |
| 8,915,611 B2 | 12/2014 | Zhang |

(56) References Cited

U.S. PATENT DOCUMENTS

| | | |
|---|---|---|
| 8,917,962 B1 | 12/2014 | Nichol et al. |
| 8,950,919 B2 | 2/2015 | Chen |
| 8,960,969 B2 | 2/2015 | Freund |
| 8,975,827 B2 | 3/2015 | Chobot et al. |
| 9,028,123 B2* | 5/2015 | Nichol .............. G02B 6/0076 349/63 |
| 9,046,225 B2 | 6/2015 | Meyers et al. |
| 9,081,125 B2 | 7/2015 | Dau et al. |
| 2001/0019479 A1 | 9/2001 | Nakabayashi et al. |
| 2002/0061178 A1 | 5/2002 | Winston et al. |
| 2002/0172039 A1 | 11/2002 | Inditsky |
| 2003/0034985 A1 | 2/2003 | Needham Riddle et al. |
| 2003/0146688 A1 | 8/2003 | Kitazawa et al. |
| 2004/0008952 A1 | 1/2004 | Kragl |
| 2004/0080938 A1 | 4/2004 | Holman et al. |
| 2004/0135933 A1 | 7/2004 | Leu et al. |
| 2004/0146241 A1 | 7/2004 | Deladurantaye et al. |
| 2004/0213003 A1 | 10/2004 | Lauderdale et al. |
| 2004/0240217 A1 | 12/2004 | Rice |
| 2005/0024744 A1 | 2/2005 | Falicoff et al. |
| 2005/0111235 A1 | 5/2005 | Suzuki et al. |
| 2005/0201103 A1 | 9/2005 | Saccomanno et al. |
| 2005/0210643 A1 | 9/2005 | Mezei et al. |
| 2005/0286251 A1 | 12/2005 | Smith |
| 2006/0002146 A1 | 1/2006 | Baba |
| 2006/0072203 A1 | 4/2006 | Lee |
| 2006/0076568 A1 | 4/2006 | Keller et al. |
| 2006/0147151 A1 | 7/2006 | Wanninger et al. |
| 2006/0187651 A1 | 8/2006 | Kim et al. |
| 2006/0262376 A1* | 11/2006 | Mather .............. G02B 6/0038 359/248 |
| 2006/0262521 A1 | 11/2006 | Piepgras et al. |
| 2007/0081780 A1 | 4/2007 | Scholl |
| 2007/0086179 A1 | 4/2007 | Chen et al. |
| 2007/0121340 A1 | 5/2007 | Hoshi |
| 2007/0139905 A1 | 6/2007 | Birman et al. |
| 2007/0189033 A1 | 8/2007 | Watanabe et al. |
| 2007/0223247 A1 | 9/2007 | Lee et al. |
| 2007/0245607 A1 | 10/2007 | Awai et al. |
| 2007/0253058 A1 | 11/2007 | Wood |
| 2007/0274654 A1 | 11/2007 | Choudhury et al. |
| 2008/0002399 A1 | 1/2008 | Villard et al. |
| 2008/0037284 A1 | 2/2008 | Rudisill |
| 2008/0094853 A1 | 4/2008 | Kim et al. |
| 2008/0137695 A1 | 6/2008 | Takahashi et al. |
| 2008/0186273 A1 | 8/2008 | Krijn et al. |
| 2008/0192458 A1 | 8/2008 | Li |
| 2008/0199143 A1 | 8/2008 | Turner |
| 2008/0266879 A1 | 10/2008 | Chang |
| 2008/0266901 A1 | 10/2008 | Chang |
| 2009/0027893 A1 | 1/2009 | Chang |
| 2009/0067194 A1* | 3/2009 | Sanchez ............ G02B 6/0065 362/618 |
| 2009/0091948 A1 | 4/2009 | Wang et al. |
| 2009/0103293 A1 | 4/2009 | Harbers et al. |
| 2009/0175050 A1 | 7/2009 | Marttila et al. |
| 2009/0196071 A1 | 8/2009 | Matheson et al. |
| 2009/0257242 A1 | 10/2009 | Wendman |
| 2009/0297090 A1 | 12/2009 | Bogner et al. |
| 2009/0309494 A1 | 12/2009 | Patterson et al. |
| 2009/0310367 A1 | 12/2009 | Kuo |
| 2009/0316414 A1 | 12/2009 | Yang et al. |
| 2010/0008088 A1 | 1/2010 | Koizumi et al. |
| 2010/0008628 A1 | 1/2010 | Shani |
| 2010/0027257 A1 | 2/2010 | Boonekamp et al. |
| 2010/0046219 A1 | 2/2010 | Pijlman et al. |
| 2010/0053959 A1 | 3/2010 | Ijzerman et al. |
| 2010/0073597 A1 | 3/2010 | Bierhuizen et al. |
| 2010/0079843 A1 | 4/2010 | Derichs et al. |
| 2010/0079980 A1 | 4/2010 | Sakai |
| 2010/0110673 A1 | 5/2010 | Bergman et al. |
| 2010/0110679 A1 | 5/2010 | Teng et al. |
| 2010/0118531 A1 | 5/2010 | Montagne |
| 2010/0128483 A1 | 5/2010 | Reo et al. |
| 2010/0133422 A1 | 6/2010 | Lin et al. |
| 2010/0157577 A1 | 6/2010 | Montgomery et al. |
| 2010/0208460 A1 | 8/2010 | Ladewig et al. |
| 2010/0220484 A1 | 9/2010 | Shani et al. |
| 2010/0220497 A1 | 9/2010 | Ngai |
| 2010/0231143 A1 | 9/2010 | May et al. |
| 2010/0238645 A1 | 9/2010 | Bailey |
| 2010/0238671 A1 | 9/2010 | Catone et al. |
| 2010/0246158 A1 | 9/2010 | Van Gorkom et al. |
| 2010/0254129 A1 | 10/2010 | Le Toquin et al. |
| 2010/0301360 A1 | 12/2010 | Van De Ven et al. |
| 2010/0302135 A1 | 12/2010 | Larson et al. |
| 2010/0302218 A1 | 12/2010 | Bita et al. |
| 2010/0302616 A1 | 12/2010 | Bita et al. |
| 2010/0302783 A1 | 12/2010 | Shastry et al. |
| 2010/0302803 A1 | 12/2010 | Bita et al. |
| 2010/0315833 A1 | 12/2010 | Holman et al. |
| 2010/0320904 A1 | 12/2010 | Meir |
| 2010/0328936 A1 | 12/2010 | Pance et al. |
| 2011/0007505 A1 | 1/2011 | Wang et al. |
| 2011/0013397 A1 | 1/2011 | Catone et al. |
| 2011/0013420 A1 | 1/2011 | Coleman et al. |
| 2011/0037388 A1 | 2/2011 | Lou et al. |
| 2011/0044022 A1 | 2/2011 | Ko et al. |
| 2011/0044582 A1 | 2/2011 | Travis et al. |
| 2011/0051457 A1 | 3/2011 | Chen |
| 2011/0058372 A1 | 3/2011 | Lerman et al. |
| 2011/0063830 A1 | 3/2011 | Narendran et al. |
| 2011/0063838 A1 | 3/2011 | Dau et al. |
| 2011/0063855 A1 | 3/2011 | Vissenberg |
| 2011/0069843 A1 | 3/2011 | Cohen et al. |
| 2011/0122616 A1 | 5/2011 | Hochstein |
| 2011/0141547 A1* | 6/2011 | Griffiths .............. G02B 6/0043 359/291 |
| 2011/0163681 A1 | 7/2011 | Dau et al. |
| 2011/0163683 A1 | 7/2011 | Steele et al. |
| 2011/0170289 A1 | 7/2011 | Allen et al. |
| 2011/0176325 A1* | 7/2011 | Sherman .............. G02B 6/0018 362/551 |
| 2011/0180818 A1 | 7/2011 | Lerman et al. |
| 2011/0187273 A1 | 8/2011 | Summerford et al. |
| 2011/0193105 A1 | 8/2011 | Lerman et al. |
| 2011/0193106 A1 | 8/2011 | Lerman et al. |
| 2011/0193114 A1 | 8/2011 | Lerman et al. |
| 2011/0195532 A1 | 8/2011 | Lerman et al. |
| 2011/0198631 A1 | 8/2011 | Lerman et al. |
| 2011/0198632 A1 | 8/2011 | Lerman et al. |
| 2011/0199769 A1 | 8/2011 | Bretschneider et al. |
| 2011/0204390 A1 | 8/2011 | Lerman et al. |
| 2011/0204391 A1 | 8/2011 | Lerman et al. |
| 2011/0210861 A1 | 9/2011 | Winton et al. |
| 2011/0228527 A1 | 9/2011 | Van Gorkom et al. |
| 2011/0233568 A1 | 9/2011 | An et al. |
| 2011/0248287 A1 | 10/2011 | Yuan et al. |
| 2011/0249467 A1 | 10/2011 | Boonekamp |
| 2011/0261570 A1 | 10/2011 | Okada et al. |
| 2011/0273079 A1 | 11/2011 | Pickard et al. |
| 2011/0273882 A1 | 11/2011 | Pickard |
| 2011/0280043 A1 | 11/2011 | Van Ostrand et al. |
| 2011/0299807 A1 | 12/2011 | Kim et al. |
| 2011/0305018 A1 | 12/2011 | Angelini et al. |
| 2011/0305027 A1 | 12/2011 | Ham |
| 2011/0317436 A1 | 12/2011 | Kuan |
| 2012/0008338 A1 | 1/2012 | Ono et al. |
| 2012/0014128 A1 | 1/2012 | Lin |
| 2012/0020108 A1 | 1/2012 | Chang |
| 2012/0026728 A1 | 2/2012 | Lou et al. |
| 2012/0026828 A1 | 2/2012 | Fjellstad et al. |
| 2012/0033445 A1 | 2/2012 | Desmet et al. |
| 2012/0039073 A1 | 2/2012 | Tong |
| 2012/0051041 A1 | 3/2012 | Edmond et al. |
| 2012/0068615 A1 | 3/2012 | Duong |
| 2012/0069575 A1 | 3/2012 | Koh et al. |
| 2012/0069579 A1 | 3/2012 | Koh et al. |
| 2012/0069595 A1 | 3/2012 | Catalano |
| 2012/0075873 A1 | 3/2012 | Cooper |
| 2012/0113676 A1 | 5/2012 | Van Dijk et al. |
| 2012/0114284 A1 | 5/2012 | Ender |
| 2012/0120651 A1 | 5/2012 | Peck |
| 2012/0140461 A1 | 6/2012 | Pickard |

(56) References Cited

U.S. PATENT DOCUMENTS

| | | |
|---|---|---|
| 2012/0147624 A1 | 6/2012 | Li et al. |
| 2012/0152490 A1 | 6/2012 | Wen et al. |
| 2012/0170266 A1 | 7/2012 | Germain et al. |
| 2012/0170316 A1 | 7/2012 | Lee et al. |
| 2012/0170318 A1 | 7/2012 | Tsai et al. |
| 2012/0182767 A1 | 7/2012 | Pectavich et al. |
| 2012/0188774 A1 | 7/2012 | Okada |
| 2012/0212957 A1 | 8/2012 | Hyun et al. |
| 2012/0230019 A1 | 9/2012 | Peifer |
| 2012/0242930 A1 | 9/2012 | Ryu et al. |
| 2012/0250296 A1 | 10/2012 | Lu et al. |
| 2012/0250319 A1 | 10/2012 | Dau et al. |
| 2012/0257383 A1 | 10/2012 | Zhang |
| 2012/0268931 A1 | 10/2012 | Lerman et al. |
| 2012/0268932 A1 | 10/2012 | Lerman et al. |
| 2012/0287619 A1 | 11/2012 | Pickard et al. |
| 2012/0287654 A1 | 11/2012 | He et al. |
| 2012/0287674 A1* | 11/2012 | Nichol ............... G02B 6/0018 362/611 |
| 2012/0287677 A1 | 11/2012 | Wheatley et al. |
| 2012/0298181 A1 | 11/2012 | Cashion et al. |
| 2012/0307496 A1 | 12/2012 | Phillips et al. |
| 2012/0320626 A1 | 12/2012 | Quilici et al. |
| 2012/0326614 A1 | 12/2012 | Tsuji et al. |
| 2013/0003363 A1 | 1/2013 | Lu et al. |
| 2013/0003409 A1 | 1/2013 | Vissenberg et al. |
| 2013/0010464 A1 | 1/2013 | Shuja et al. |
| 2013/0028557 A1 | 1/2013 | Lee et al. |
| 2013/0033867 A1 | 2/2013 | Coplin et al. |
| 2013/0037838 A1 | 2/2013 | Speier et al. |
| 2013/0038219 A1 | 2/2013 | Dau et al. |
| 2013/0039050 A1 | 2/2013 | Dau et al. |
| 2013/0039090 A1 | 2/2013 | Dau et al. |
| 2013/0044480 A1 | 2/2013 | Sato et al. |
| 2013/0077298 A1 | 3/2013 | Steele et al. |
| 2013/0107518 A1 | 5/2013 | Boyer et al. |
| 2013/0107527 A1 | 5/2013 | Boyer et al. |
| 2013/0107528 A1 | 5/2013 | Boyer et al. |
| 2013/0128593 A1 | 5/2013 | Luo |
| 2013/0170210 A1 | 7/2013 | Athalye |
| 2013/0201715 A1 | 8/2013 | Dau et al. |
| 2013/0208461 A1 | 8/2013 | Warton et al. |
| 2013/0208495 A1 | 8/2013 | Dau et al. |
| 2013/0214300 A1 | 8/2013 | Lerman et al. |
| 2013/0215612 A1 | 8/2013 | Garcia |
| 2013/0223057 A1 | 8/2013 | Gassner et al. |
| 2013/0229804 A1 | 9/2013 | Holder et al. |
| 2013/0229810 A1 | 9/2013 | Pelka et al. |
| 2013/0250584 A1 | 9/2013 | Wang et al. |
| 2013/0279198 A1 | 10/2013 | Lin et al. |
| 2013/0294059 A1 | 11/2013 | Galluccio et al. |
| 2013/0294063 A1 | 11/2013 | Lou et al. |
| 2013/0300310 A1 | 11/2013 | Hu et al. |
| 2013/0314943 A1* | 11/2013 | Huang ............... G02B 6/0053 362/606 |
| 2013/0317784 A1 | 11/2013 | Huang et al. |
| 2013/0328073 A1 | 12/2013 | Lowes et al. |
| 2013/0336001 A1 | 12/2013 | Boonekampt |
| 2013/0343045 A1 | 12/2013 | Lodhie et al. |
| 2013/0343055 A1 | 12/2013 | Eckert et al. |
| 2013/0343079 A1 | 12/2013 | Unger et al. |
| 2014/0003041 A1 | 1/2014 | Dau et al. |
| 2014/0029257 A1 | 1/2014 | Boyer et al. |
| 2014/0036510 A1 | 2/2014 | Preston et al. |
| 2014/0071687 A1 | 3/2014 | Tickner et al. |
| 2014/0168955 A1 | 6/2014 | Gershaw |
| 2014/0211457 A1 | 7/2014 | Tarsa et al. |
| 2014/0211462 A1 | 7/2014 | Keller et al. |
| 2014/0211476 A1 | 7/2014 | Yuan et al. |
| 2014/0211495 A1 | 7/2014 | Yuan et al. |
| 2014/0211496 A1 | 7/2014 | Durkee |
| 2014/0211497 A1 | 7/2014 | Yuan et al. |
| 2014/0211502 A1 | 7/2014 | Keller et al. |
| 2014/0211503 A1 | 7/2014 | Tarsa et al. |
| 2014/0211504 A1 | 7/2014 | Yuan et al. |
| 2014/0211508 A1 | 7/2014 | Yuan et al. |
| 2014/0212090 A1 | 7/2014 | Wilcox et al. |
| 2014/0268762 A1 | 9/2014 | Raleigh et al. |
| 2014/0268875 A1 | 9/2014 | Durkee |
| 2014/0268879 A1 | 9/2014 | Mizuyama et al. |
| 2014/0270672 A1 | 9/2014 | Durkee |
| 2014/2688761 | 9/2014 | Raleigh et al. |
| 2014/0334126 A1 | 11/2014 | Speier et al. |
| 2014/0347885 A1 | 11/2014 | Wilcox et al. |
| 2014/0355297 A1 | 12/2014 | Castillo et al. |
| 2014/0355302 A1 | 12/2014 | Wilcox et al. |
| 2015/0003059 A1 | 1/2015 | Haitz et al. |
| 2015/0049507 A1 | 2/2015 | Shani et al. |
| 2015/0049511 A1 | 2/2015 | Tarsa et al. |
| 2015/0055369 A1 | 2/2015 | Tarsa et al. |
| 2015/0055371 A1 | 2/2015 | van De Ven et al. |
| 2015/0109820 A1 | 4/2015 | Wilcox et al. |
| 2015/0160396 A1 | 6/2015 | Wilcox et al. |
| 2015/0177439 A1 | 6/2015 | Durkee et al. |
| 2015/0192742 A1* | 7/2015 | Tarsa ............... G02B 6/34 385/36 |
| 2015/0198760 A1 | 7/2015 | Wilcox et al. |
| 2015/0204491 A1 | 7/2015 | Yuan et al. |
| 2015/0260905 A1 | 9/2015 | Yuan et al. |
| 2016/0209577 A1* | 7/2016 | Ford ............... G02B 6/0036 |
| 2016/0349442 A1* | 12/2016 | Berard ............... B32B 17/10018 |

\* cited by examiner

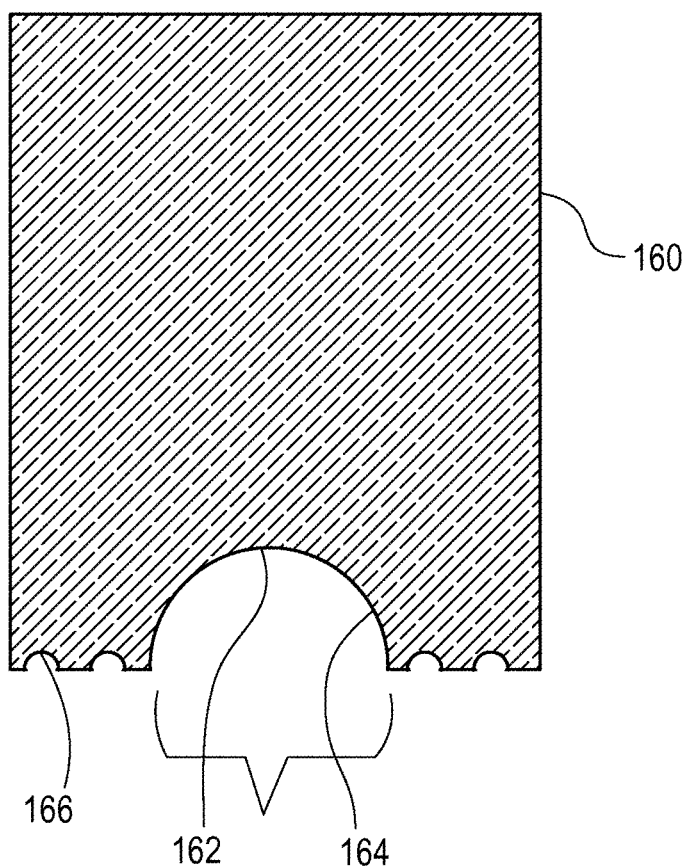

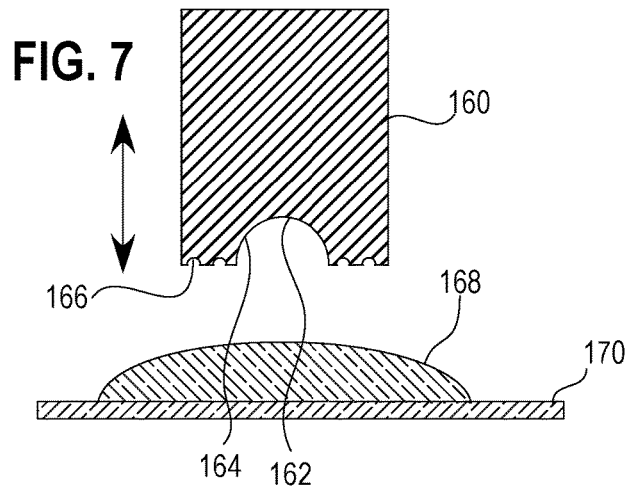
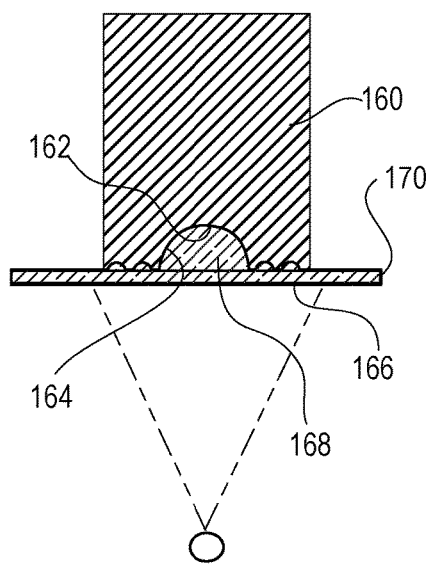
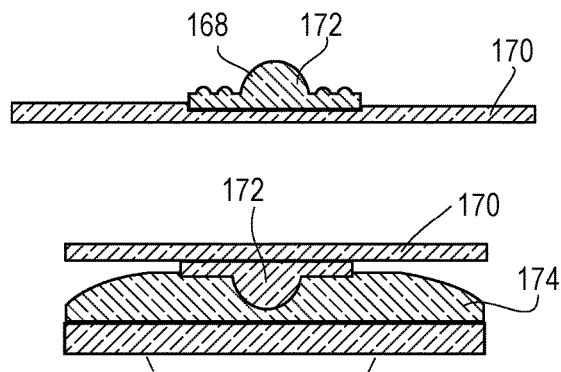
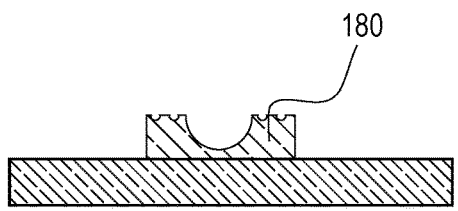

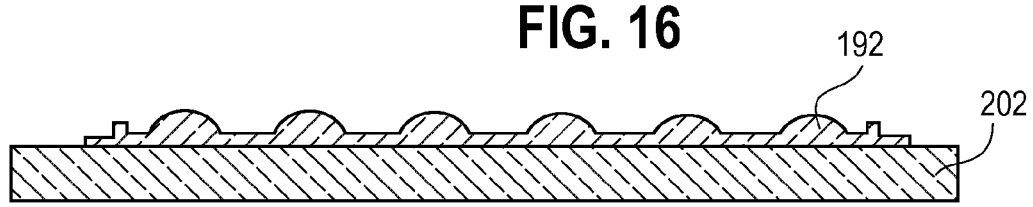
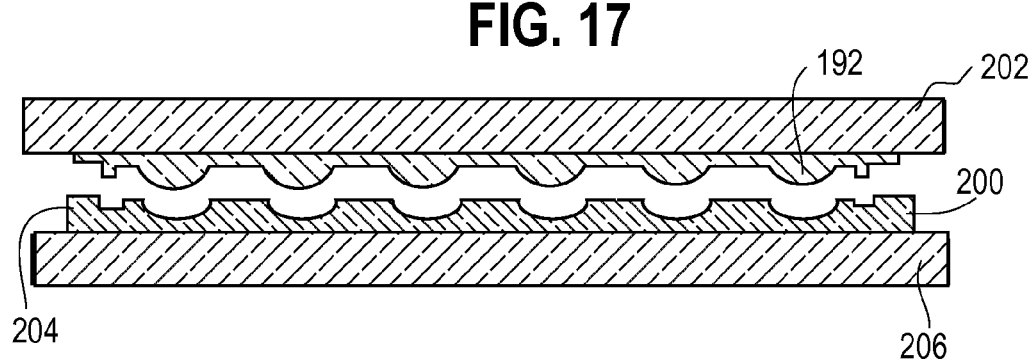
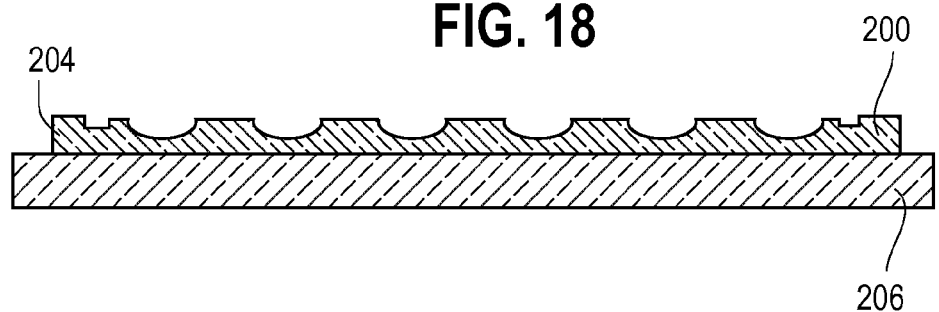

OPTICAL ELEMENT AND METHOD OF FORMING AN OPTICAL ELEMENT

CROSS REFERENCE TO RELATED APPLICATIONS

The present application comprises a continuation-in-part of U.S. patent application Ser. No. 14/577,730, filed Dec. 19, 2014, entitled "Optical Waveguide Bodies and Luminaires Utilizing Same", which claims the benefit of U.S. Provisional Patent Application No. 61/922,017, filed Dec. 30, 2013, entitled "Optical Waveguide Bodies and Luminaires Utilizing Same" and additionally comprises a continuation-in-part of U.S. patent application Ser. No. 14/472,078, filed Aug. 28, 2014, entitled "Waveguide Having Unidirectional Illuminance", which claims the benefit of U.S. Provisional Patent Application Ser. No. 62/020,866, filed Jul. 3, 2014, entitled "Luminaires Utilizing Edge Coupling" all owned by the assignee of the present application, and the disclosures of which are incorporated by reference herein. The present application further comprises a continuation-in-part of U.S. patent application Ser. No. 13/842,521, filed Mar. 15, 2013, entitled "Optical Waveguides", and further comprises a continuation-in-part of U.S. patent application Ser. No. 13/839,949, filed Mar. 15, 2013, entitled "Optical Waveguide and Lamp Including Same", and further comprises a continuation-in-part of U.S. patent application Ser. No. 13/841,074, filed Mar. 15, 2013, entitled "Optical Waveguide Body", and further comprises a continuation-in-part of U.S. application Ser. No. 13/841,622, filed Mar. 15, 2013, entitled "Shaped Optical Waveguide Bodies", and further comprises a continuation-in-part of U.S. patent application Ser. No. 13/840,563, filed Mar. 15, 2013, entitled "Optical Waveguide and Luminaire Incorporating Same", and further comprises a continuation-in-part of U.S. patent application Ser. No. 13/938,877, filed Jul. 10, 2013, entitled "Optical Waveguide and Luminaire Incorporating Same", and further comprises a continuation-in-part of U.S. patent application Ser. No. 14/015,801, filed Aug. 30, 2013, entitled "Consolidated Troffer", and further comprises a continuation-in-part of U.S. patent application Ser. No. 14/101,086, filed Dec. 9, 2013, entitled "Optical Waveguides and Luminaires Incorporating Same", and further comprises a continuation-in-part of U.S. patent application Ser. No. 14/101,132, filed Dec. 9, 2013, entitled "Waveguide Bodies Including Redirection Features and Methods of Producing Same", and further comprises a continuation-in-part of U.S. patent application Ser. No. 14/101,147, filed Dec. 9, 2013, entitled "Luminaires Using Waveguide Bodies and Optical Elements", and further comprises a continuation-in-part of U.S. patent application Ser. No. 14/101,129, filed Dec. 9, 2013, entitled "Simplified Low Profile Module With Light Guide For Pendant, Surface Mount, Wall Mount and Stand Alone Luminaires", and further comprises a continuation-in-part of U.S. patent application Ser. No. 14/101,051, filed Dec. 9, 2013, entitled "Optical Waveguide and Lamp Including Same", and further comprises a continuation-in-part of International Application Serial No. PCT/US14/13937, filed Jan. 30, 2014, entitled "Optical Waveguide Bodies and Luminaires Utilizing Same", and further comprises a continuation-in-part of International Application Serial No. PCT/US14/13931, filed Jan. 30, 2014, entitled "Optical Waveguides and Luminaires Incorporating Same", and further comprises a continuation-in-part of International Application Serial No. PCT/US14/30017, filed Mar. 15, 2014, entitled "Optical Waveguide Body, and further comprises a continuation-in-part of U.S. patent application Ser. No. 14/472,064 entitled "Luminaire with Selectable Luminous Intensity Pattern", filed Aug. 28, 2014, and further comprises a continuation-in-part of U.S. patent application Ser. No. 14/472,035 entitled "Luminaires Utilizing Edge Coupling", filed Aug. 28, 2014, and further comprises a continuation-in-part of U.S. patent application Ser. No. 14/801,476 entitled "Dual Edge Coupler", filed Jul. 16, 2015, all owned by the assignee of the present application, and the disclosures of which are incorporated by reference herein.

REFERENCE REGARDING FEDERALLY SPONSORED RESEARCH OR DEVELOPMENT

Not applicable

SEQUENTIAL LISTING

Not applicable

FIELD OF DISCLOSURE

The present subject matter relates to the manufacture of optical devices, and more particularly, to a method of forming an optical element.

BACKGROUND

An optical waveguide mixes and directs light emitted by one or more light sources, such as one or more light emitting diodes (LEDs). A typical optical waveguide includes three main components: one or more coupling surfaces or elements, one or more distribution elements, and one or more extraction elements. The coupling component(s) direct light into the distribution element(s), and condition the light to interact with the subsequent components. The one or more distribution elements control how light flows through the waveguide and such control is dependent on the waveguide geometry and material. The extraction element(s) determine how light is removed by controlling where and in what direction the light exits the waveguide.

When designing a coupling element, the primary considerations are: maximizing the efficiency of light transfer from the source into the waveguide; controlling the location of light injected into the waveguide; and controlling the angular distribution of the light in the waveguide. The coupling element of a waveguide may be comprised of one or more of a number of optical elements, including a primary source optic (such as the lens on an LED component package), one or more intermediate optical elements (such as a lens or array of lenses) interposed between the source(s) and the waveguide coupling surface or surfaces, one or more reflective or scattering surfaces surrounding the sources, and specific optical geometries formed in the waveguide coupling surfaces themselves. Proper design of the elements that comprise the coupling element can provide control over the spatial and angular spread of light within the waveguide (and thus how the light interacts with the extraction elements), maximize the coupling efficiency of light into the waveguide, and improve the mixing of light from various sources within the waveguide (which is particularly important when the color from the sources varies—either by design or due to normal bin-to-bin variation in lighting components). The elements of the waveguide coupling system can use refraction, reflection, total internal reflection, and surface or volume scattering to control the distribution of light injected into the waveguide.

It is desirable to maximize the number of light rays emitted by the source(s) that impinge directly upon the coupling surface in order to increase the coupling of light from a light source into a waveguide. Light rays that are not directly incident on the waveguide from the source must undergo one or more reflections or scattering events prior to reaching the waveguide coupling surface. Each such ray is subject to absorption at each reflection or scattering event, leading to light loss and inefficiencies. Further, each ray that is incident on the coupling surface has a portion that is reflected (Fresnel reflection) and a portion that is transmitted into the waveguide. The percentage that is reflected is smallest when the ray strikes the coupling surface at an angle of incidence relative to the surface normal close to zero (i.e., approximately normal to the surface). The percentage that is reflected is largest when the ray is incident at a large angle relative to the surface normal of the coupling surface (i.e., approximately parallel to the surface).

In one type of coupling, a light source that emits a Lambertian distribution of light is positioned adjacent to the edge of a planar waveguide element. The amount of light that directly strikes the coupling surface of the waveguide in this case is limited due to the wide angular distribution of the source and the relatively small solid angle represented by the adjacent planar surface. To increase the amount of light that directly strikes the coupling surface, a flat package component such as the Cree ML-series or MK-series (manufactured and sold by Cree, Inc. of Durham, N.C., the assignee of the present application) may be used. A flat package component does not include a primary optic or lens formed about an LED chip. A flat emitting surface of the flat package component may be placed in close proximity to the coupling surface of the waveguide. This arrangement helps ensure a large portion of the emitted light is directly incident on the waveguide.

After light has been coupled into the waveguide, it must be guided and conditioned to the locations of extraction. In accordance with well-known principles of total internal reflection light traveling through a waveguide is reflected back into the waveguide from an outer surface thereof, provided that the incident light does not strike the outer surface at an angle less than a critical angle with respect to the surface. Specifically, the light rays continue to travel through the waveguide until such rays strike an index interface surface at a particular angle less than an angle measured with respect to a line normal to the surface point at which the light rays are incident (or, equivalently, until the light rays exceed an angle measured with respect to a line tangent to the surface point at which the light rays are incident) and the light rays escape.

In order for an extraction element to remove light from the waveguide, the light must first contact the feature comprising the element. By appropriately shaping the waveguide surfaces, one can control the flow of light across the extraction feature(s) and thus influence both the position from which light is emitted and the angular distribution of the emitted light. Specifically, the design of the coupling and distribution surfaces, in combination with the spacing (distribution), shape, and other characteristic(s) of the extraction features provide control over the appearance of the waveguide (luminance), its resulting light distribution (illuminance), and system optical efficiency.

Light extracting elements have been designed that can be applied to a waveguide element to obtain a desired illuminance distribution. Such elements are disclosed in U.S. patent application Ser. Nos. 14/472,078 and 14/472,064, owned by the assignee of the present application and the disclosures of which are hereby incorporated by reference herein. Such light extracting elements are disposed on one or more sheets of transparent material that are, in turn, secured by a transparent adhesive to a waveguide element. While a waveguide manufactured using such a process is effective to produce a desired illumination distribution, use of an adhesive reduces efficiency and imposes an extra step and expense into the production resulting in decreased throughput and increased cost.

SUMMARY

According to one aspect, an optical waveguide comprises a waveguide body exhibiting total internal reflection, a substrate, and a plurality of light extraction features disposed on a surface of the substrate. The light extraction features are non-adhesively bonded to the waveguide body.

According to yet another aspect, an optical element comprises an optically transparent substrate and a plurality of light extracting features of optically transparent material that exhibit total internal reflection. The light extracting features are disposed on opposing sides of the substrate. The optical element further includes a waveguide body wherein light extraction features on one of the sides of the substrate are secured to the waveguide body.

According to a still further aspect, a method of forming an optical element comprises the steps of providing a first body of material, forming the first body of material into a first feature having a first size, and reducing the first feature to a second size less than the first size to form a second feature comprising a scaled version of the first feature. The second feature is used as a master in a forming process.

Other aspects and advantages will become apparent upon consideration of the following detailed description and the attached drawings wherein like numerals designate like structures throughout the specification.

BRIEF DESCRIPTION OF THE DRAWINGS

FIGS. 6-22 are fragmentary enlarged cross sectional views of a manufacturing process for producing the optical waveguide of FIG. 1;

DETAILED DESCRIPTION

Figure 1:
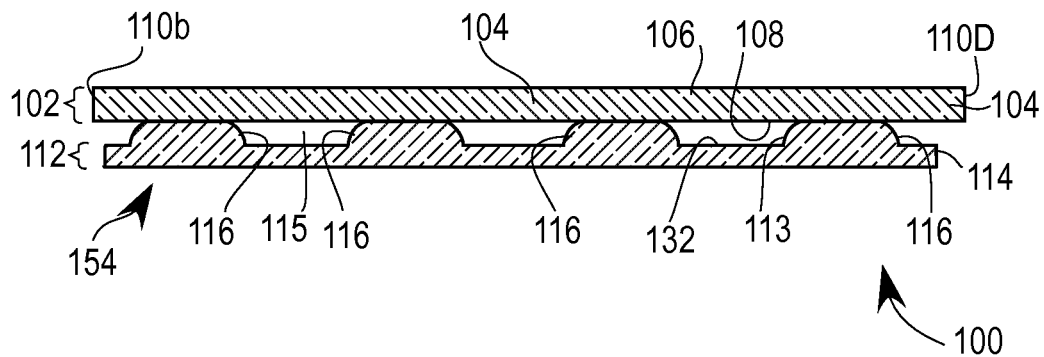
FIG. 1 is a fragmentary enlarged cross sectional view of an optical waveguide.

Referring to FIG. 1, a waveguide 100 includes a waveguide element or body 102 typically, although not necessarily, comprising a planar element section 104 having major faces 106, 108 terminating at side edges 110a, 110b, 110c, and 110d. The waveguide 100 further includes an optical element 112 comprising a plurality of light extraction features 113 disposed on and/or in a substrate 114. In the illustrated embodiments, the light extraction features 113 comprise microfeature bodies 116 disposed on a substrate. However, the light extraction features 113 may comprise one or more bodies disposed on and/or in the substrate 114 (i.e., one or more bodies may be on and fully outside the substrate 114, fully disposed within the substrate, or partially inside and partially outside the substrate 114), one or more fully encapsulated or partially encapsulated cavities or voids 115 disposed in the substrate 114, or a combination of such bodies 116 and cavities 115. In the case of bodies 116, such bodies 116 may have the same or a different index of refraction as the index of refraction of the substrate 114. In the case of cavities 115, one or more of such cavities 115 may be fully or partially evacuated, and/or fully or partially filled with air or another material, again, with the same or a different index of refraction. The substrate 114 may be a single layer of optically transparent material or may comprise multiple layers of the same or different materials. In the latter case, one or more of the aforementioned cavities 115 may be formed in the substrate 114 by an absence of material in one or more of the layers.

The waveguide body 102 may be of any suitable shape. In the illustrated embodiment, the waveguide body 102 is planar, although the body 102 may alternatively have any other shape. Further, the substrate 114 may comprise a film, a plate, a block of material, or any other material having a surface and/or a shape that conforms or is conformable to a surface of a waveguide body.

Figure 1A:
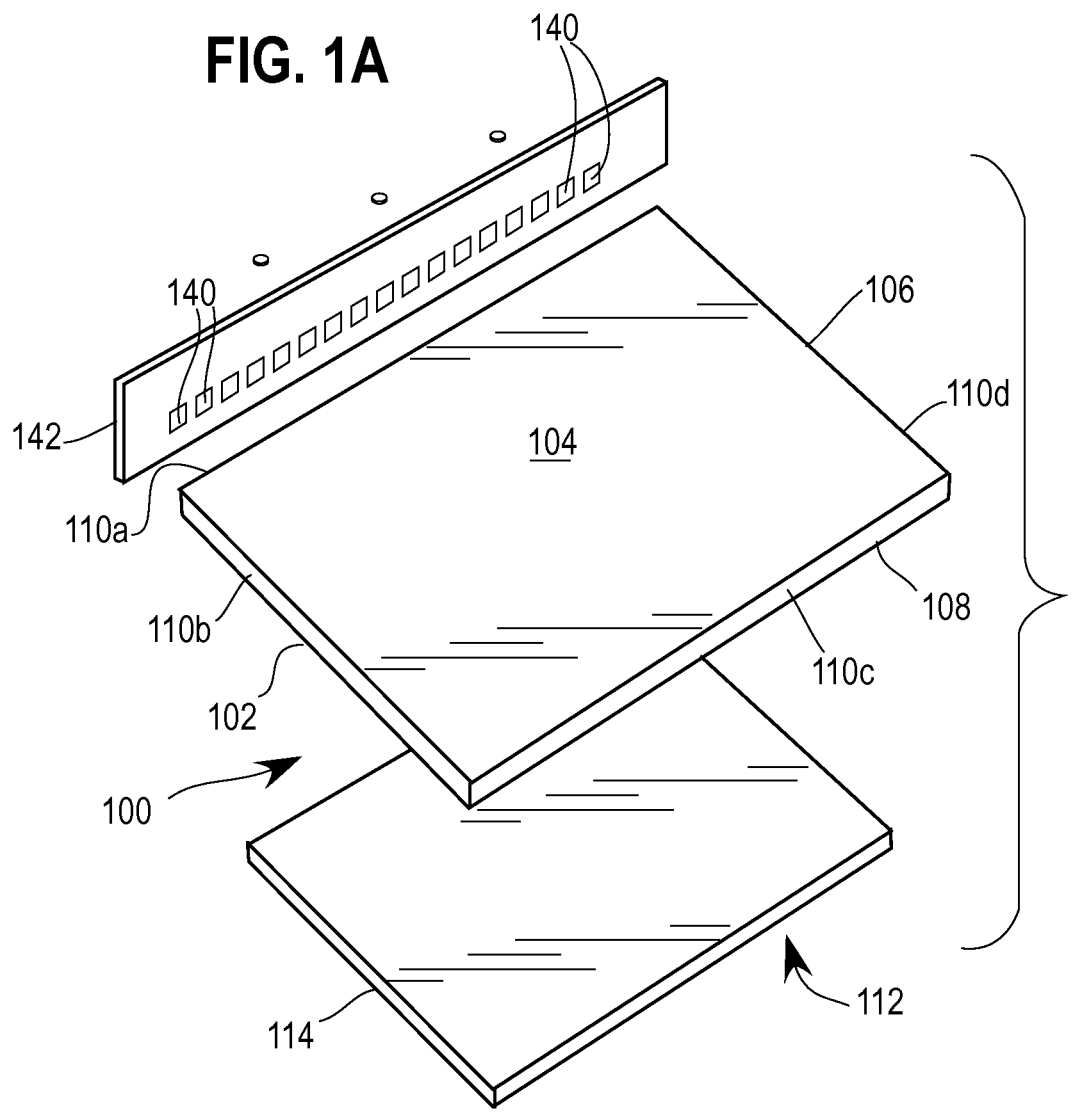
FIG. 1A is an top isometric exploded view of the waveguide of FIG. 1 in conjunction with a light source.
Figure 1B:
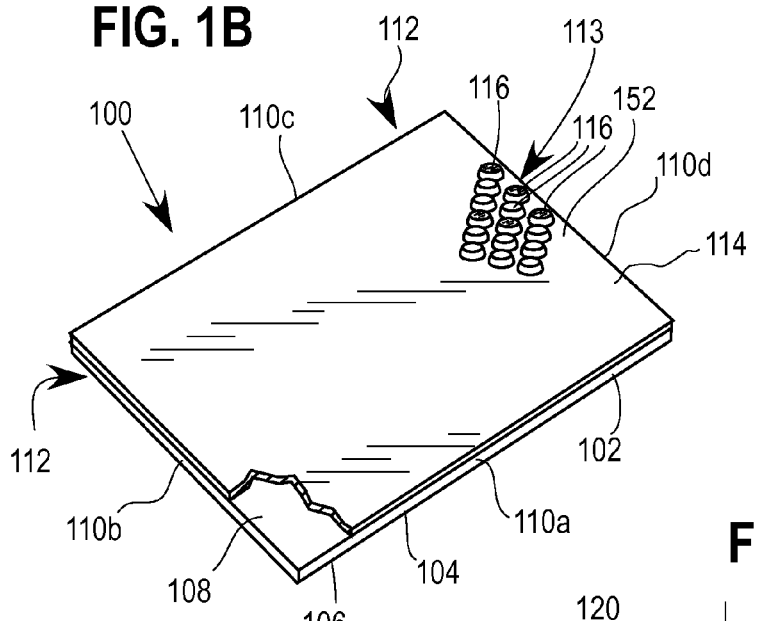
FIG. 1B is a bottom isometric view of the waveguide of FIG. 1 with a portion of the substrate broken away and the light source omitted therefrom.
Figure 1C:
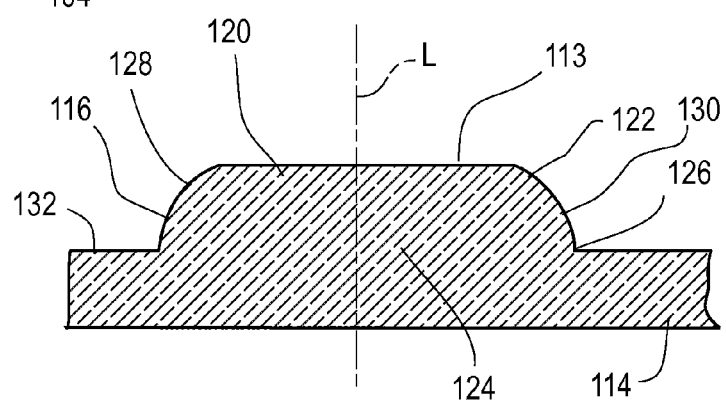
FIG. 1C is a fragmentary side elevational view of one of the light extraction features disposed on the substrate of FIG. 1.

As seen in FIG. 1C, each of the light extraction microfeature bodies 116 has a first end 120 at which a tip portion 122 is disposed, a second end 124 opposite the first end 120 at which a base portion 126 is disposed, and an intermediate portion 128 disposed between the first and second ends 120, 124. The intermediate portion 128 includes a side surface 130. In general, the side surface 130 is preferably (although not necessarily) curved, linear, or a combination of curved and linear portions and is symmetric about a longitudinal axis L and has a cross sectional dimension that decreases from the second end 124 to the first end 120. In the illustrated embodiment, the side surface 130 comprises a rounded shouldered portion 131a disposed adjacent the first end 120 having a substantially constant radius of curvature and a frustoconical or right circular cylindrical portion 131b disposed between the shouldered portion 131a and the second end 124. Further, as noted in greater detail hereinafter, the tip portion 122 is preferably, but not necessarily, planar and non-adhesively bonded to the face 108 of the waveguide body 102, and the base portion 126 is preferably (although not necessarily) non-adhesively bonded to a surface 132 of the substrate 114. Such an arrangement results in the light extraction features 113 being undercut relative to the direction of light extraction.

As seen in FIG. 1A, the waveguide 100 may receive light developed by one or more LED elements or modules 140 disposed on a printed circuit board 142 or other light source disposed adjacent, for example, one of the side edges 110, such as the edge 110a. Each LED element or module 140 may be a single white or other color LED chip or other bare component, or each may comprise multiple LEDs either mounted separately or together on a single substrate or package to form a module including, for example, at least one phosphor-coated LED either alone or in combination with at least one color LED, such as a green LED, a yellow LED, a red LED, etc. In those cases where a soft white illumination with improved color rendering is to be produced, each LED element or module 140 or a plurality of such elements or modules may include one or more blue shifted yellow LEDs and one or more red LEDs. The LEDs may be disposed in different configurations and/or layouts as desired. Different color temperatures and appearances could be produced using other LED combinations, as is known in the art. The luminaire may include LEDs elements or modules 140 of the same type of phosphor-converted white LED, or any combination of the same or different types of LED elements or modules 140 discussed herein. In some embodiments, a luminaire may include a plurality of groups of LED elements or modules 140, where each group may include LED elements or modules 140 having different colors and/or color temperatures. Further, in one embodiment, each LED element or module 140 comprises any LED, for example, an MT-G LED incorporating True-White® LED technology or as disclosed in U.S. patent application Ser. No. 13/649,067, filed Oct. 10, 2012, entitled "LED Package with Multiple Element Light Source and Encapsulant Having Planar Surfaces" by Lowes et al., the disclosure of which is hereby incorporated by reference herein, as developed and manufactured by Cree, Inc., the assignee of the present application. If desirable, a side emitting LED disclosed in U.S. Pat. No. 8,541,795, the disclosure of which is incorporated by reference herein, may be utilized inside the waveguide body. In some embodiments, each LED element or module 140 may comprise plural LEDs that are disposed vertically (i.e., arranged relative to one another in a direction extending between the faces 106, 108 of the waveguide body 102). In any of the embodiments disclosed herein the LED element(s) or module(s) 140 preferably have a Lambertian or near-Lambertian light distribution, although each may have a directional emission distribution (e.g., a side emitting distribution), as necessary or desirable. More generally, any lambertian, symmetric, wide angle, preferential-sided, or asymmetric beam pattern LED(s) may be used.

Any of the embodiments disclosed herein may include a power circuit having a buck regulator, a boost regulator, a buck-boost regulator, a SEPIC power supply, or the like, and may comprise a driver circuit as disclosed in U.S. patent application Ser. No. 14/291,829, filed May 30, 2014, entitled "High Efficiency Driver Circuit with Fast Response" by Hu et al. or U.S. patent application Ser. No. 14/292,001, filed May 30, 2014, entitled "SEPIC Driver Circuit with Low Input Current Ripple" by Hu et al. incorporated by reference herein. The circuit may further be used with light control circuitry that controls color temperature of any of the embodiments disclosed herein in accordance with user input such as disclosed in U.S. patent application Ser. No. 14/292,286, filed May 30, 2014, entitled "Lighting Fixture Providing Variable CCT" by Pope et al. incorporated by reference herein.

Further, any of the embodiments disclosed herein may include one or more communication components forming a part of the light control circuitry, such as an RF antenna that senses RF energy. The communication components may be included, for example, to allow the luminaire to communicate with other luminaires and/or with an external wireless controller, such as disclosed in U.S. patent application Ser. No. 13/782,040, filed Mar. 1, 2013, entitled "Lighting Fixture for Distributed Control" or U.S. Provisional Application Ser. No. 61/932,058, filed Jan. 27, 2014, entitled "Enhanced Network Lighting" both owned by the assignee of the present application and the disclosures of which are incorporated by reference herein. More generally, the control circuitry includes at least one of a network component, an RF component, a control component, and a sensor. The sensor may provide an indication of ambient lighting levels thereto and/or occupancy within the room or illuminated area. Such sensor may be integrated into the light control circuitry.

The components described above may be disposed in a frame or other enclosure 143 (FIG. 1D) to obtain a luminaire 144 suitable for general lighting applications. Light developed by the LED elements or modules 140 is injected into the waveguide body 102 and travels by total internal reflection between the faces 106, 108 of the waveguide body 102. The extraction features 113 extract light out of the face 108 in a desired illumination distribution.

The light extraction bodies 116 may be arranged in a non-random and/or random pattern on the surface 132 of the substrate 114 and positioned between the surface 132 and the surface 108 of the waveguide body 102 when joined to the waveguide body 102. Alternately, the shape, size, or density of extraction elements 113 may be varied across the surface of the substrate 114 in order to produce a desired luminance distribution—for example, to provide a uniform luminance appearance across the light emitting region of the luminaire.

Figure 1D:
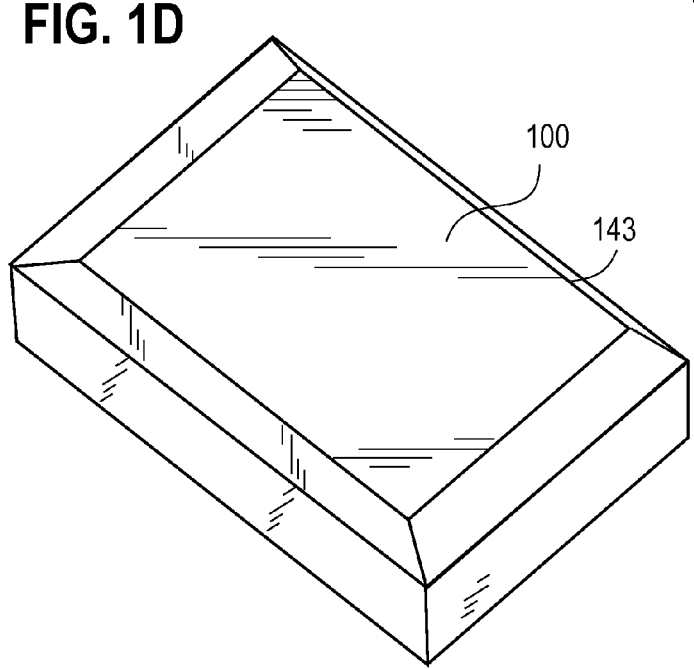
FIG. 1D is an isometric view of a luminaire incorporating the optical waveguide of FIG. 1.

The extraction features 113 of the present disclosure control stray light and provide for high efficiency extraction, highly directional light distributions (i.e., a high proportion of light emitted from one side of the waveguide body 102), and a wide range of illuminance distributions. Various types of lamps or luminaires, including those requiring dispersed or Lambertian illuminance distributions (e.g., typical troffers for general lighting, such as seen in FIG. 1D), collimating distributions (e.g., downlights or spotlights), and light sources requiring specific illuminance patterns (e.g., streetlights, architectural lighting) can be realized using the optical waveguide body 102 and extraction features 113 disclosed herein.

Figure 2:
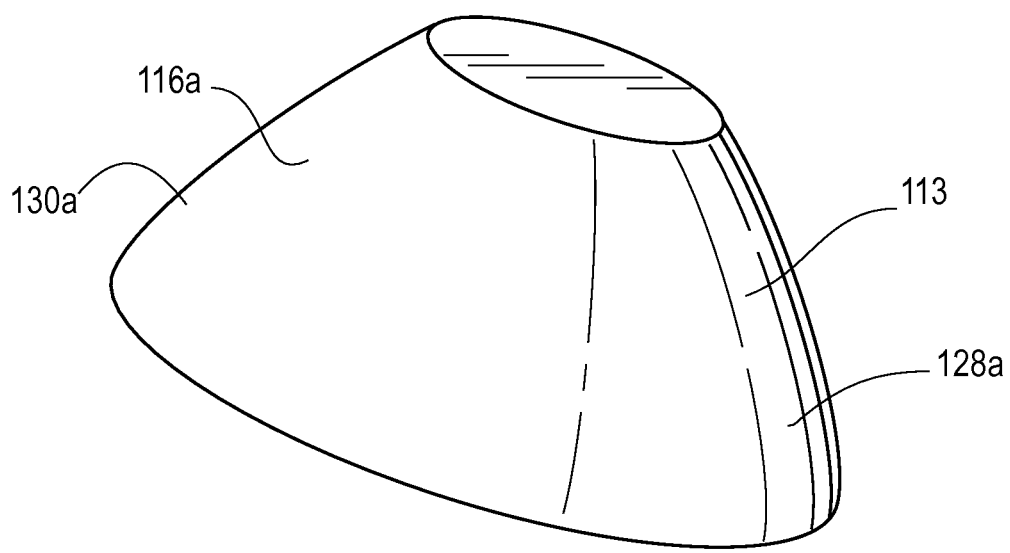
FIGS. 2-5 are enlarged isometric views of alternative light extraction features that may be disposed on the substrate of FIG. 1.
Figure 3:
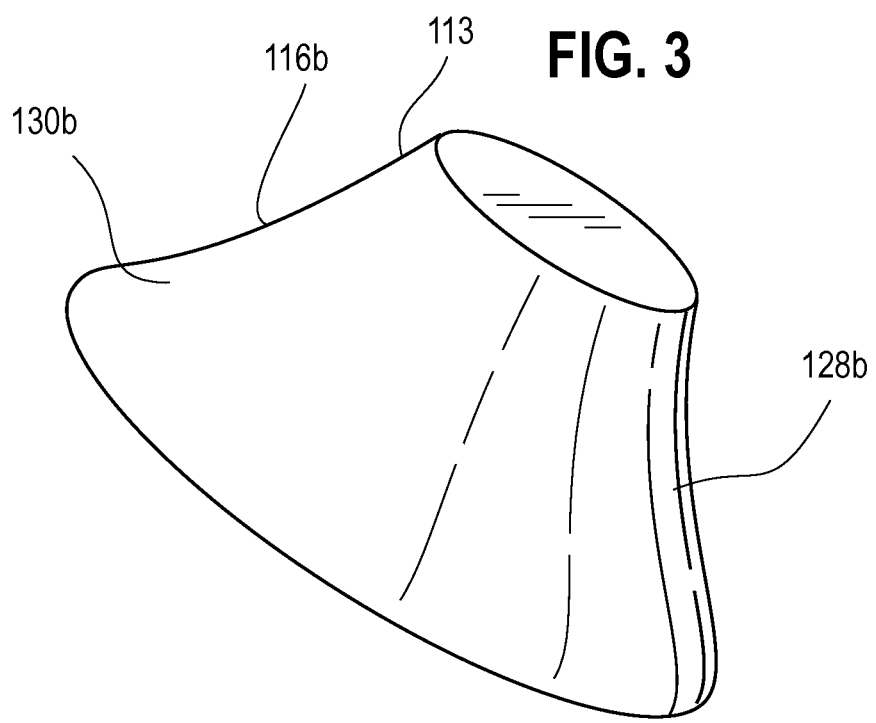
Figure 4:
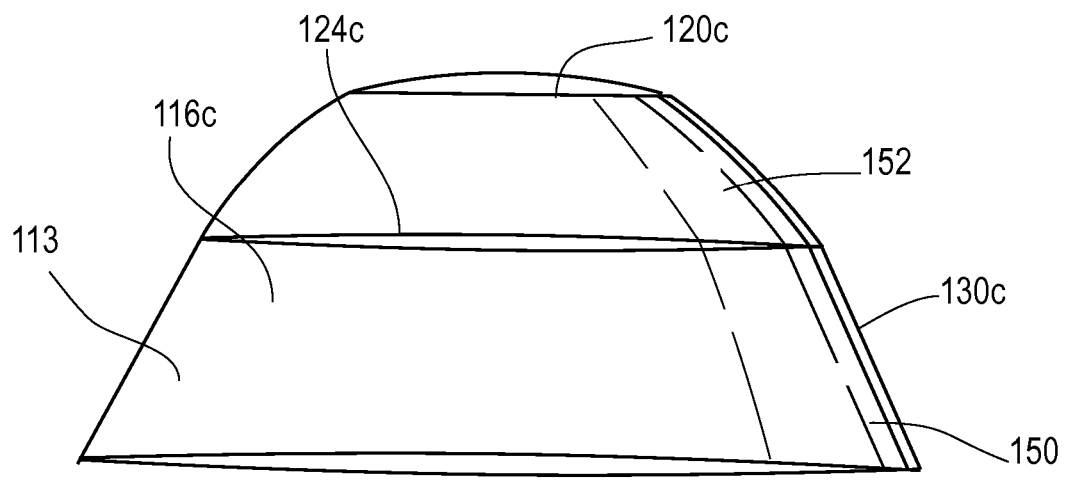
Figure 5:
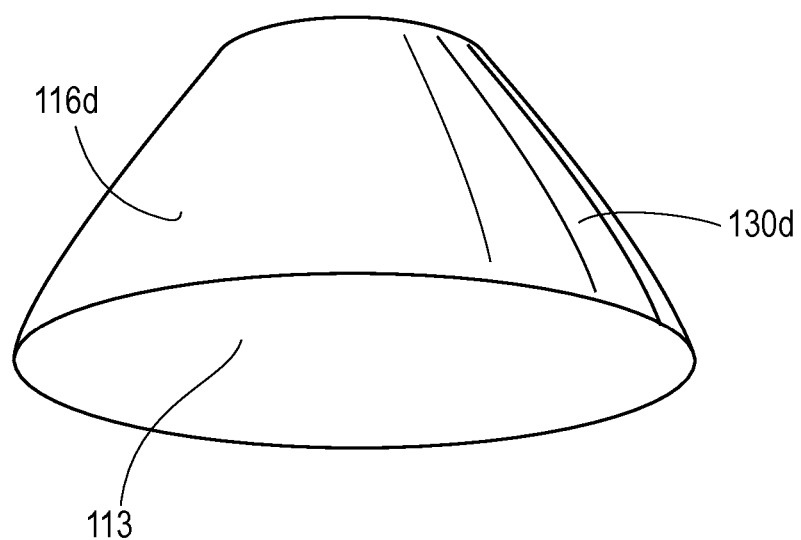
Figure 12:
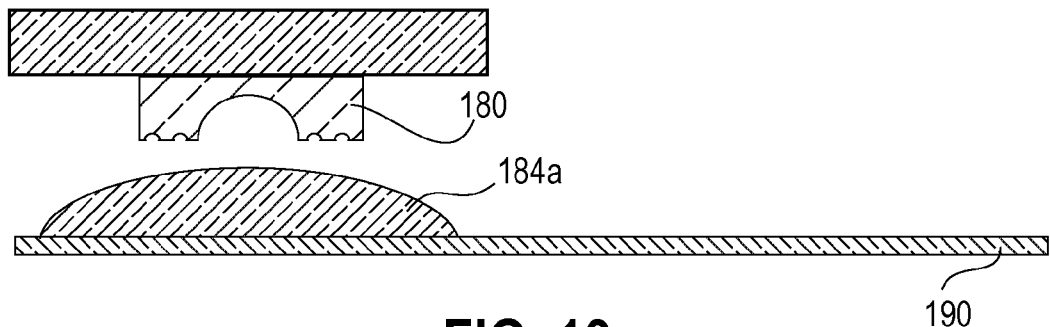
Figure 13:
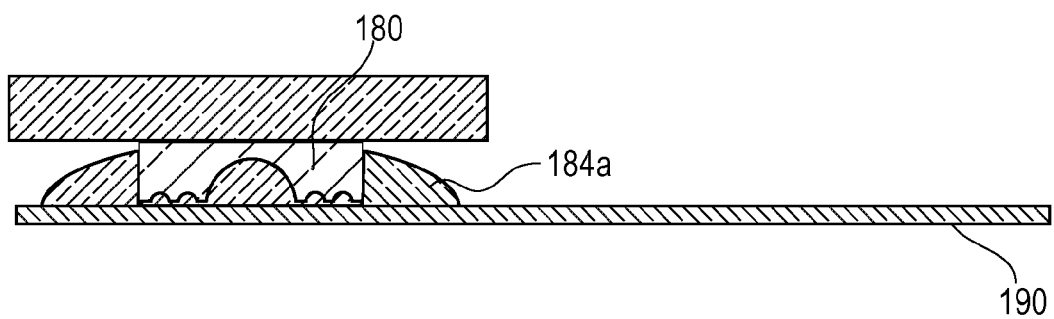
Figure 14:
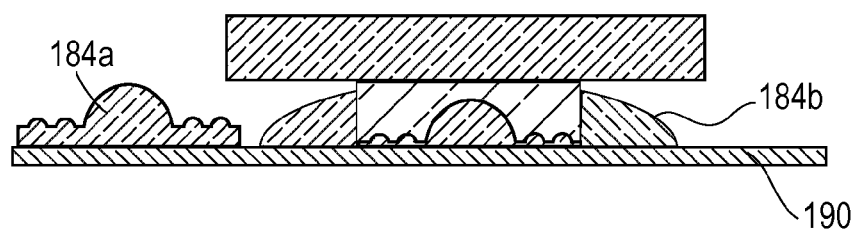

FIGS. 2-5 illustrate further examples of light extraction features 113 that may be disposed on the substrate 114. FIGS. 2 and 3 illustrate light extraction features 116a, 116b, respectively, that have simple curved intermediate portions 128a, 128b each having a side surface 130a, 130b each comprising a section of a circle (i.e., a constant radius of curvature) in cross section. The side surface 130a is convex in cross section whereas the side surface 130b is concave in cross section. The embodiment of FIG. 4 comprises a light extraction feature 116c having a side surface 130c defining a frustoconical portion 150 adjacent a second end 124c and a curved portion 152 having a constant radius of curvature in cross-section disposed between the frustoconical portion 150 and a first end 120c. FIG. 5 illustrates a light extraction feature 116d having a parabolic side surface 130d. The light extraction features 113 may alternatively have a truncated hemispherical shape (FIG. 1) or any other shape(s) (such as prismatic) necessary to produce a desired light distribution.

Referring to FIGS. 1-1C, the extraction features 113, substrate 114, and/or optical waveguide body 102 may be made of the same or different optical grade materials including acrylic, such as an acrylic UV-curable resin, molded silicone, air, polycarbonate, glass, cyclic olefin copolymers, or other suitable material(s) and combinations thereof, possibly, although not necessarily, in a layered arrangement to achieve a desired effect. In one example embodiment shown in FIG. 1, the substrate 114 and the extraction bodies 116 disposed on the surface 132 of the substrate 114 comprise a hot embossed or electroformed acrylic lenticular film 154, as described in greater detail hereinafter. Alternately, the substrate 114 and extraction bodies 116 may be fabricated using one of a variety of techniques typically used in the formation of micro-optical films including nano-imprint lithography, gray-scale lithography, micro-replication, injection/compression molding, reactive ion etching, chemical embossing, drum roll transfer, and the like. Other methods of fabrication include dispensing an acrylic-based UV resin or silicone material on a carrier film that is subsequently cured to form extraction features 113. Further, the film 154 could be fabricated directly on the face 108 of the waveguide body 102 by means of a sacrificial intermediate layer similar or identical to that described in U.S. Pat. No. 8,564,004, the disclosure of which is hereby incorporated by reference herein. Further, additional embodiments may utilize geometries, spacings, methods of manufacture, and any other details related to the extraction features as described in U.S. patent application Ser. No. 14/472,078, entitled "Waveguide Having Unidirectional Illuminance", filed Aug. 28, 2014, the disclosure of which is incorporated by reference herein. Still further, regions between the extraction bodies 116 after attachment to the waveguide body 102 may partially or wholly comprise a material other than air—for example, a material (including, but not limited to, a solid and/or a fluid) having an index of refraction that is the same as or different than that of the waveguide body 102 and the substrate 114, a vacuum, water, a gas, etc.

Figure 25:
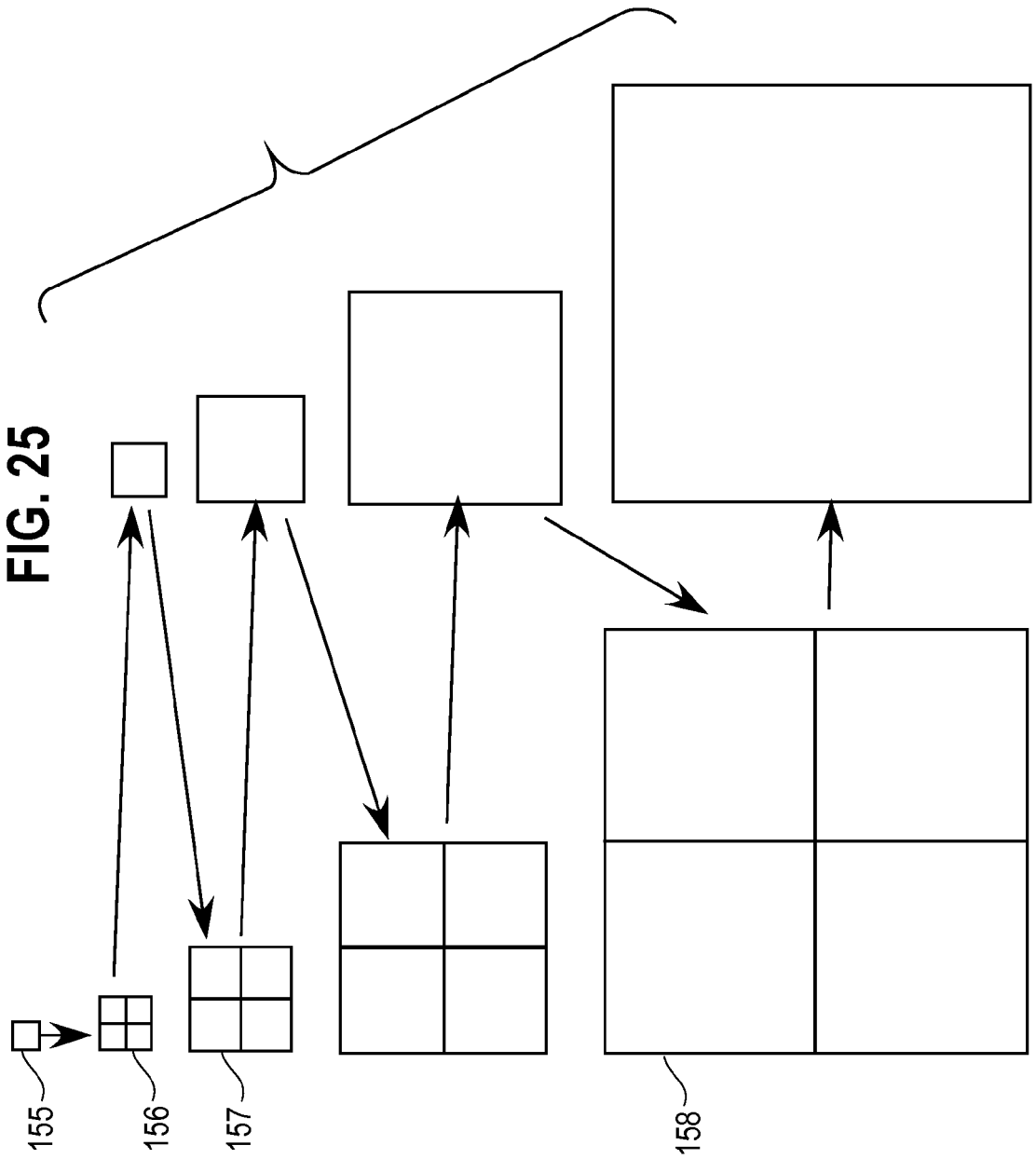
FIG. 25 is a diagrammatic plan view illustrating how replication is used in the process of FIGS. 6-22.

FIG. 25 diagrammatically illustrates a process by which the film 154 is formed, irrespective of which light extraction features 113 are used and the pattern of the light extraction features 113 on the substrate 114. The process comprises a replication of elements in successive steps that ultimately results in the formation of a master that can be used to produce a film 154 of a desired size. Specifically, a first element or set of elements 155 is formed that is then used in a first step and repeat process to create a first sub-master 156. The first sub-master 156 is thereafter used in a further step and repeat process to create a further sub-master 157. The steps are repeated until the master 158 is produced. If necessary, the master 158 is converted to a positive embossing master, which is then used in a hot embossing or electroforming process to create film sections. If necessary, the film sections are separated from one another. The film sections are secured by non-adhesive bonding, such as by a hot embossing or thermocompression process, to waveguide bodies to produce waveguides.

Referring next to FIGS. 6-22, the process begins with the fabrication of a microfeature pin 160, which may be made of any suitable material, such as multiple layers of Kapton® by DuPont, or another suitable polyimide or any other suitable rigid material such as metal, plastic, or polymer. The pin 160 is precision laser machined to include an array of microfeatures 162 including a main feature 164 and process features 166. Because in a specific embodiment the present process comprehends exposure of materials to be formed to ultraviolet light, and because the material of the pin 160 is opaque to UV light, a duplicate of the pin 160 must be made of a material that is transparent to UV light. Accordingly, as seen in FIG. 7, the pin 160 is next brought into contact with a first body of uncured material 168 disposed on a UV-transparent substrate 170 and the material 168 is exposed to UV light to harden the material 168. The pin 160 is withdrawn and the resulting body is precision laser machined to obtain a sub-pin 172 disposed on the substrate 170 as seen in FIG. 9. The sub-pin may be made of a cyclic olefin polymer, cyclic olefin copolymer, or another suitable polymer or plastic.

As shown in FIG. 10, the sub-pin 172 as disposed on the substrate 170 is thereafter inverted and brought into contact with a further body of uncured material 174, which is then exposed to UV light to cure the second body 174. The sub-pin 172 is withdrawn and the further body is processed, preferably by precision laser machining, to produce a step and repeat sub-pin 180 shown in FIG. 11.

Figure 15:
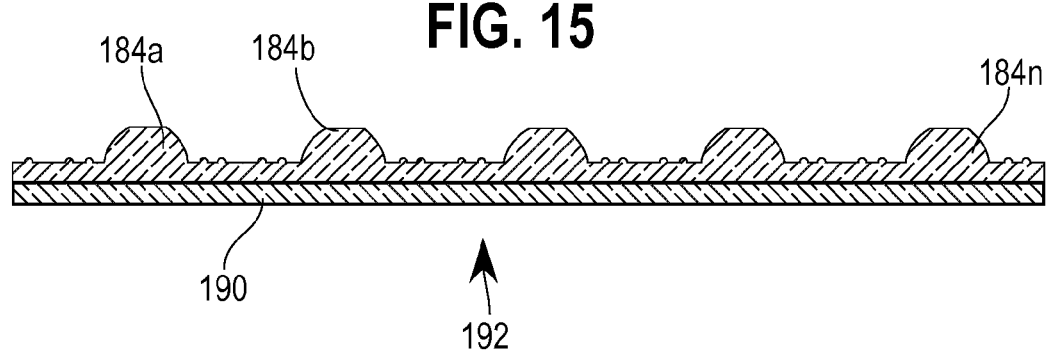

Referring next to FIGS. 12-15, the step and repeat sub-pin 180 is repeatedly brought into contact with successive bodies 184a, 184b, ..., 184N of uncured material disposed on a substrate 190. Specifically, the step and repeat sub-pin 180 is brought into contact with the first body 184a (FIGS. 12 and 13), thereafter withdrawn, moved to a position above or adjacent the second body 184b, moved into contact with the second body 184b (FIG. 14), and thereafter withdrawn. The process repeats until all of the bodies 184 have been formed (FIG. 15). Although not shown, each body 184 is exposed to UV light when the sub-pin 180 is in contact therewith to cure the material of the body 184. Also, the bodies 184 may be machined, again by precision laser machining or another suitable process, to obtain a sub-master element 192. The bodies of the sub-master element 192 may be made of a cyclic olefin polymer, cyclic olefin copolymer, or another suitable polymer or plastic. The bodies 184 of the sub-master element 192 are arranged in a desired pattern on the substrate 190, for example a random pattern, a pseudorandom pattern, a regular hexagonal pattern in which centers of the bodies 184 are disposed on vertices of adjacent and contiguous hexagons, a regular rectangular pattern in which centers of the bodies 184 are disposed on vertices of adjacent and contiguous rectangles or squares, etc.

FIGS. 16-18 illustrate fabrication of a master 200 at a desired ultimate film size from the sub-master element 192. Similar to the process used to create the sub-master element 192, the master is produced using the sub-master element 192 in a step and repeat process. Specifically, the sub-master element 192 is mounted on a movable platen 202 (FIG. 16), inverted and brought into contact with a body of moldable material 204 disposed on a stationary platen 206 wherein the material 204 is suitable for mastering in a hot embossing or thermocompression process. The moldable material 204 may be a cyclic olefin polymer, cyclic olefin copolymer, or another suitable polymer or plastic. The platen 202 is thereafter withdrawn leaving the material 204 formed in a positive profile (FIG. 17), moved laterally, and again brought into contact with the material 204. This process is repeated until the entire surface of the material 204 is formed (FIG. 18), thereby obtaining the master 200.

Figure 26:
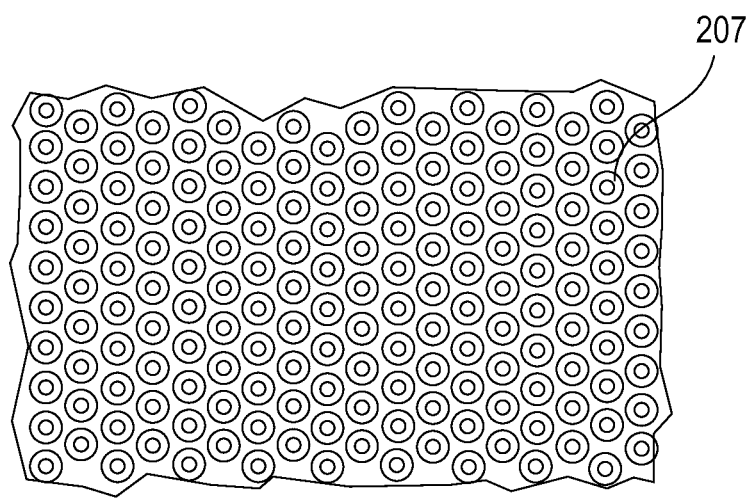
FIGS. 26 and 27 are plan and isometric views, respectively, of working stamps that may be used to create one or more sub-masters or masters in the process of FIGS. 6-22.
Figure 27:
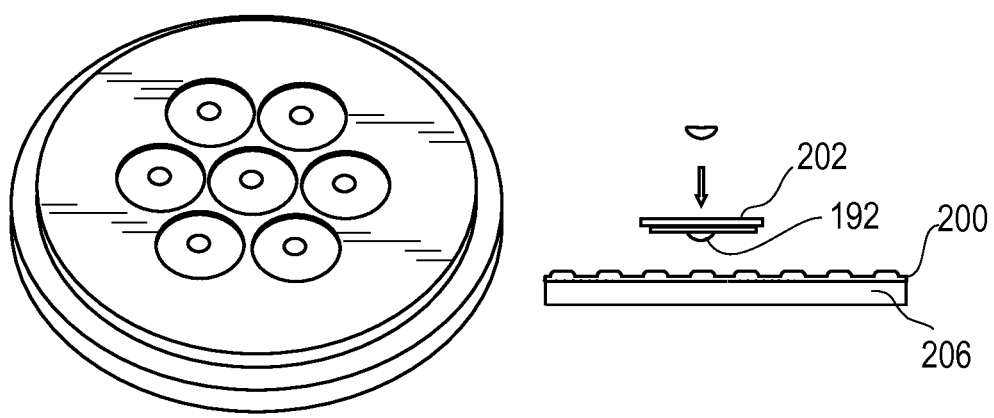

Alternatively, as seen in FIG. 26 the master 200 may be produced using a silicon processing methodology or the master 200 may be produced using a nano-imprint methodology seen in FIG. 27. The former methodology uses a nano-imprinted sub-master 207 to form the master 200 using a step and repeat process.

Figure 19:
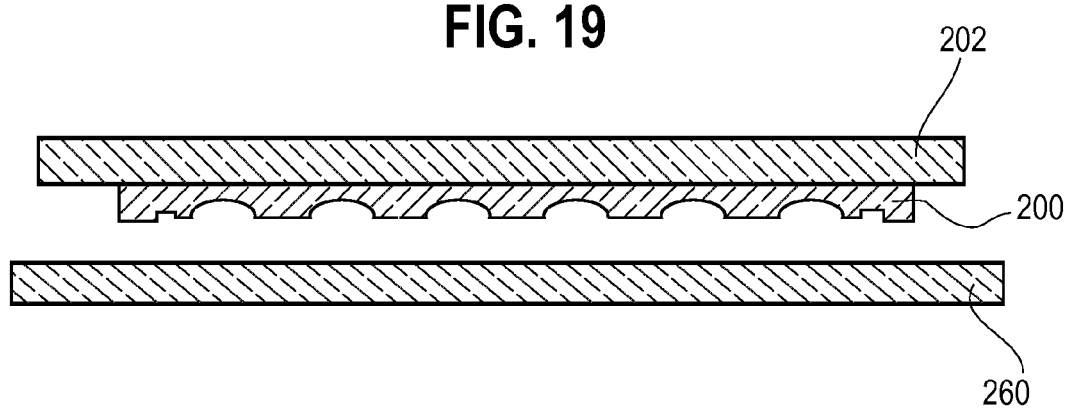
Figure 20:
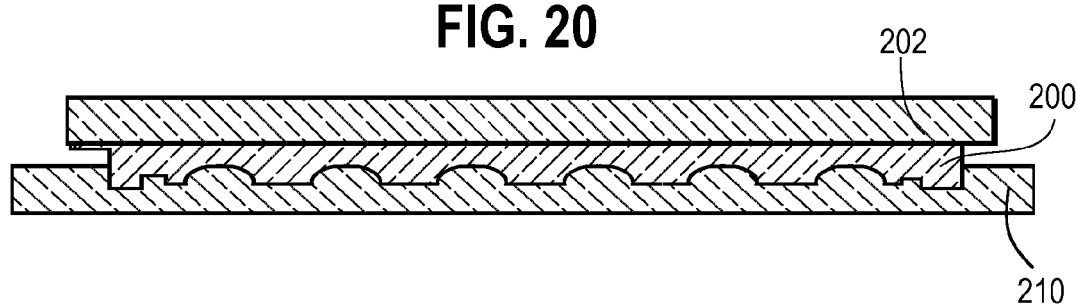
Figure 21:

Referring next to FIGS. 19-21, production of films 154 may thereafter commence using the master 200. In a hot embossing process the master 200 is moved by the platen 202 or another movable element adjacent or above a body of formable material 210 (FIG. 19). The master 200 is then moved into contact with the material 210 as seen in FIG. 20. The temperature and pressure applied to the material 210 and the duration that the temperature and pressure are applied to the material 210 by the master 200 are controlled to obtain a properly formed film 154 (FIG. 21). It should be noted that the film 154 may be manufactured in pre-cut sheet form, or may be produced serially on a web of material that is thereafter cut into individual sheets.

Figure 23:
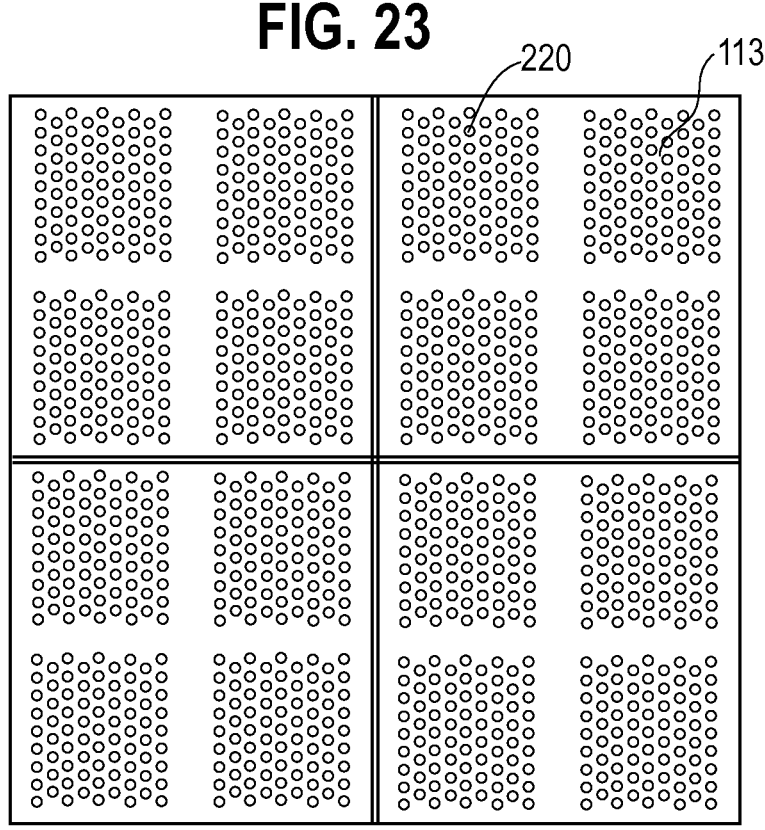
FIGS. 23 and 24 are plan views of a sample increase in packing density achievable using the manufacturing process of FIGS. 6-22.
Figure 24:
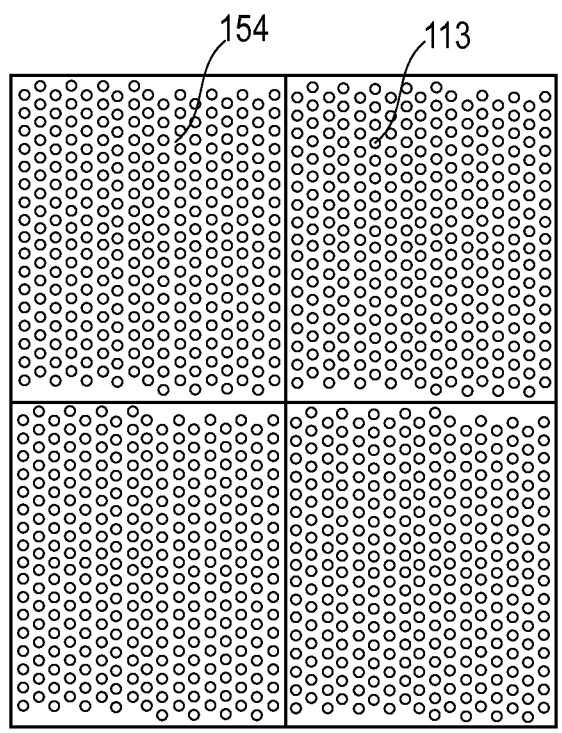
Figure 28:
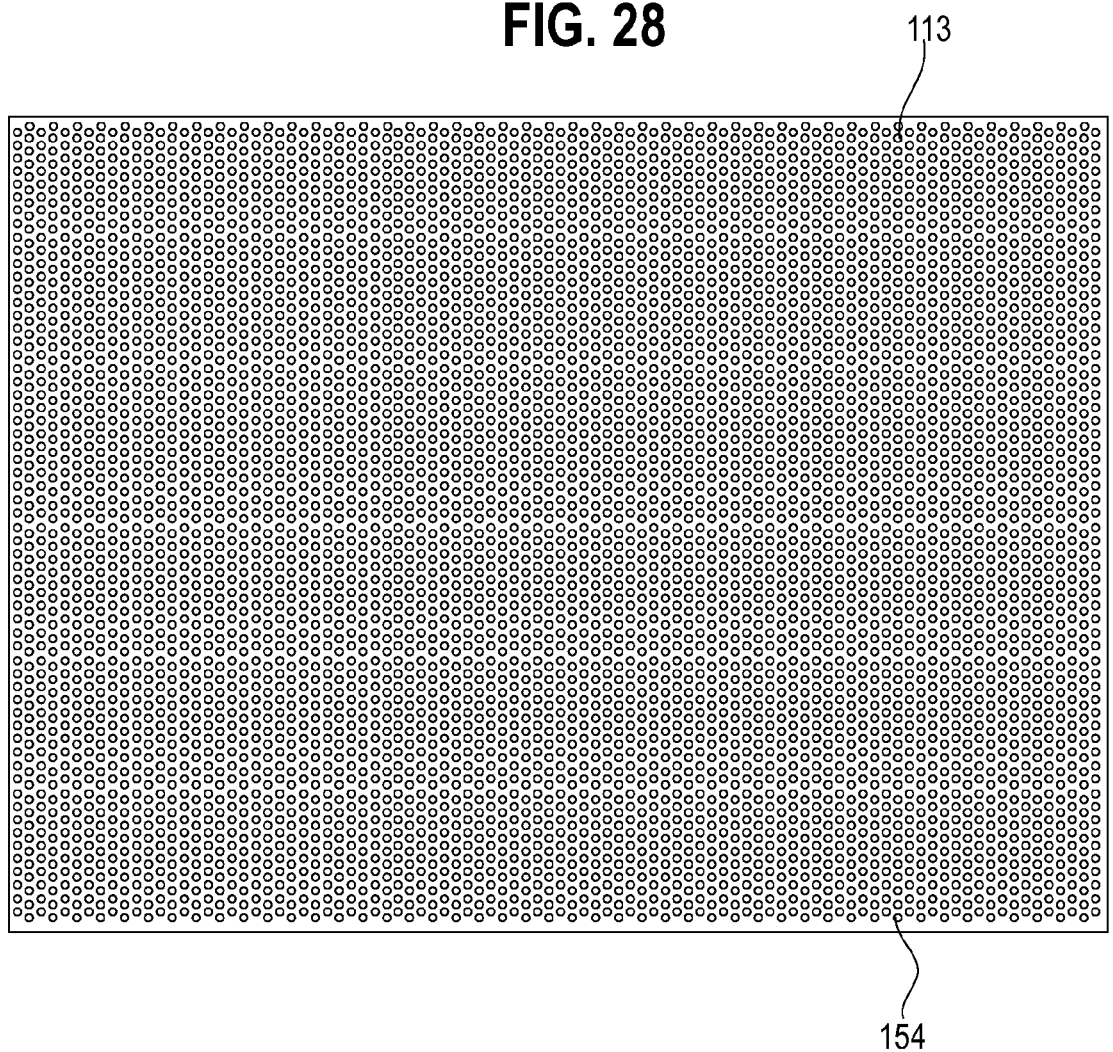
FIG. 28 is a plan view of a sample substrate with light extraction features thereon that may be produced by the process of FIGS. 6-22.
Figure 29:
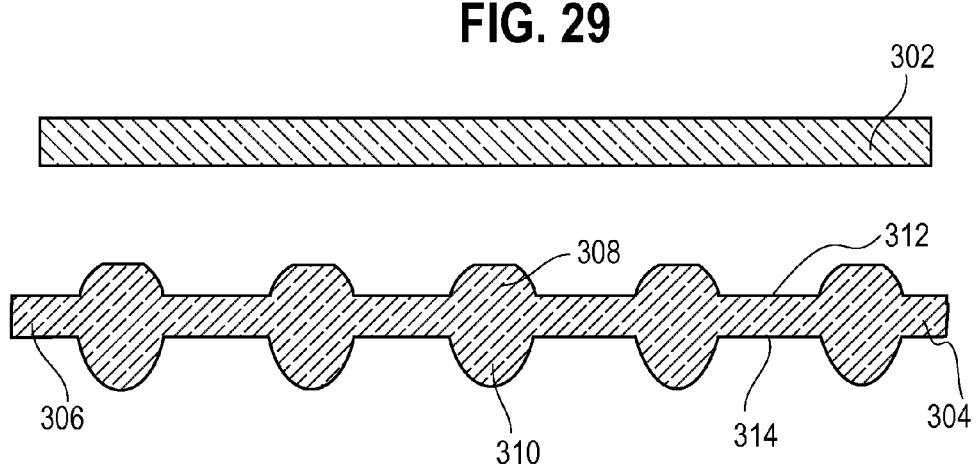
FIGS. 29 and 31 are fragmentary enlarged cross sectional views illustrating manufacture of a further waveguide utilizing a substrate with light extraction features on multiple surfaces thereof.

FIG. 23 illustrates film sections 220 that are produced using a conventional film production process whereas FIG. 24 illustrates film sections 154 producible using the forming process described herein. The film sections of FIG. 24 may be separated and trimmed to produce the film 154 shown in FIG. 28. (The extraction features 113 are shown with different scaling in FIGS. 24 and 28.) As should be evident, an increased density of extraction features 113 can be achieved using the present method. The size of the film can be made quite large, e.g., up to 12 in$^2$ or larger.

Figure 21A:
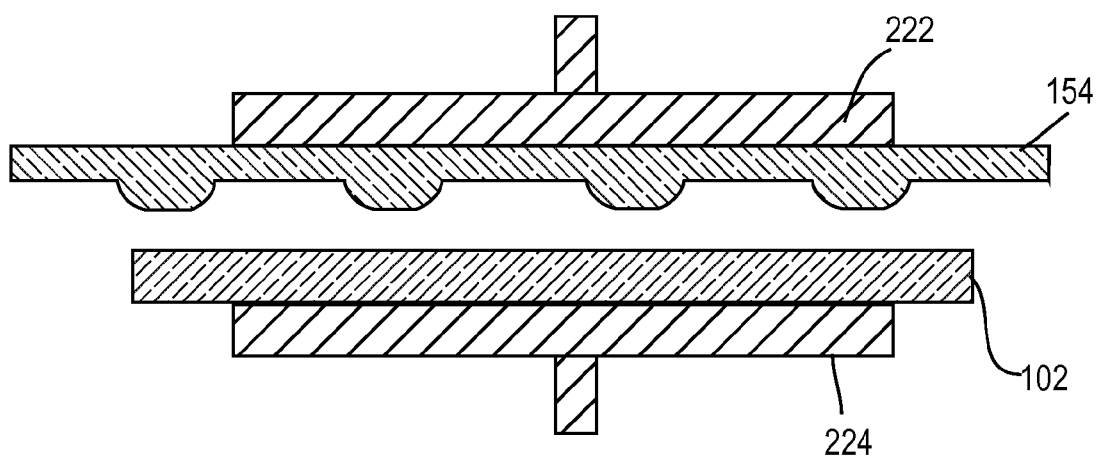
Figure 22:
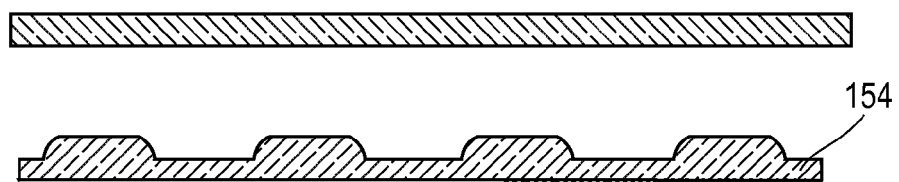

The film sections 154 are bonded to waveguide bodies 102 in a non-adhesive fashion. Specifically, a film section 154 may be accurately brought into position atop a waveguide body face 108 with the light extraction bodies 116 in contact with the face 108 by a heated movable platen 222 (FIG. 21A). Heat and pressure are applied to the substrate 114 (and, optionally, the waveguide body 102) by the platen 222, and, optionally a further platen 224, for a period of time and at a pressure sufficient to bond the microfeature extraction bodies 116 of the film section to the face 108 without adversely affecting the shapes of the extraction bodies 116 and the face 108. The same steps are undertaken when bonding the film 154 to the waveguide body 102 using a thermocompression process, with the applied temperature level, the applied pressure, and the compression duration being modified as appropriate. A finished optical waveguide 100 is illustrated in FIG. 22.

FIGS. 29-34 illustrate the structure and fabrication of an embodiment of a waveguide 300 comprising a waveguide body 302 and an optical element 304 secured to the waveguide body 302. The optical element 304 comprises a substrate 306 having first and second pluralities or sets of optical micro extraction features 308, 310 disposed on opposing faces 312, 314 of the substrate 306. The waveguide body 302 may be identical to or different than the body 102, and the extraction features of the first plurality 308 may be the same or different than the extraction features of the second plurality 310 and the extraction features of one or both pluralities 308, 310 may be of the shapes described hereinabove or may have another shape. The substrate 306 may be identical to or different than the substrate 114.

Figure 35:
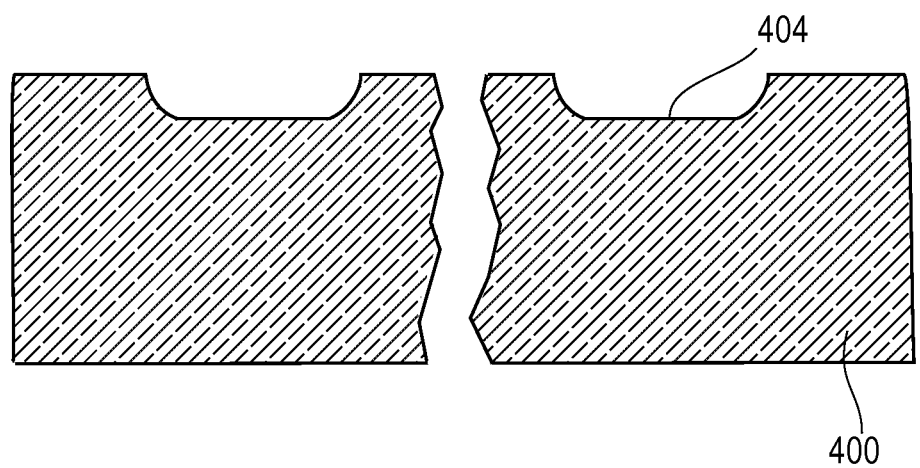
FIGS. 35 and 36 are fragmentary enlarged cross sectional views of a further manufacturing process for forming an optical element.
Figure 36:
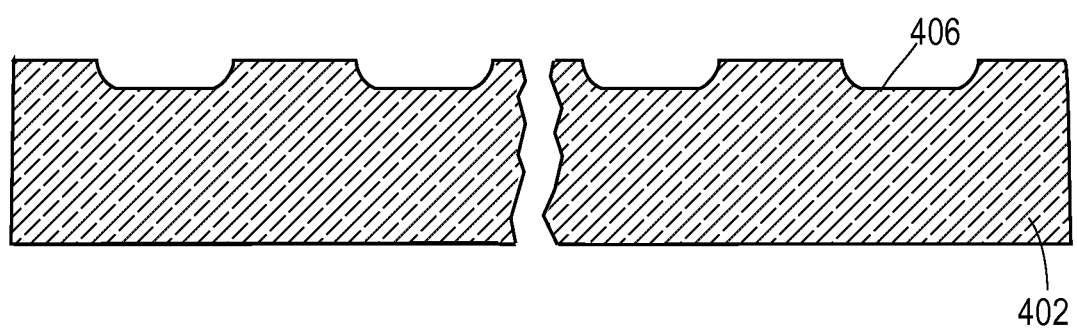

Preferably, the light extraction features 308, 310 and the substrate 306 are formed as described hereinabove, with the exception that the micro extraction features 308, 310 may be simultaneously formed on both faces 312, 314 using first and second masters 316, 318 that are produced using the step and repeat process as described hereinabove and shown in FIGS. 35 and 36. The masters 316, 318 may be brought into contact with the faces 312, 314 of the substrate 306 at the same time by relatively movable platens 317, 319, respectively. Alternatively, the light extraction features 308 and 310 may be formed at different times, if desired.

Figure 30:
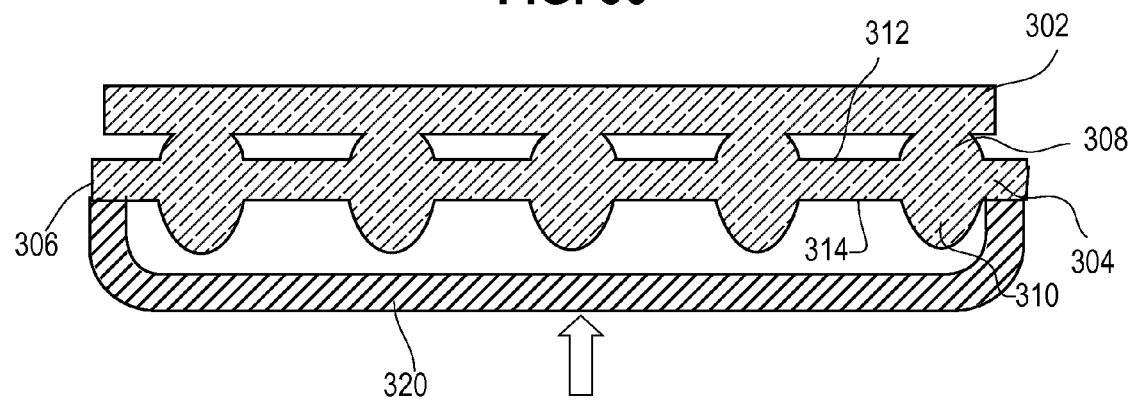
FIGS. 30 and 30A are fragmentary enlarged cross-sectional views of alternative chucks that may be used to fabricate the substrate of FIGS. 29 and 31.
Figure 30A:
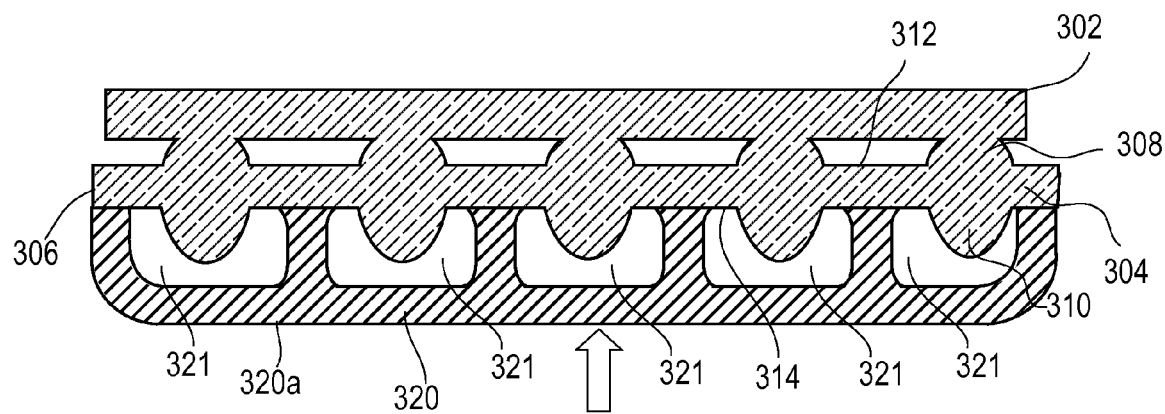
Figure 31:
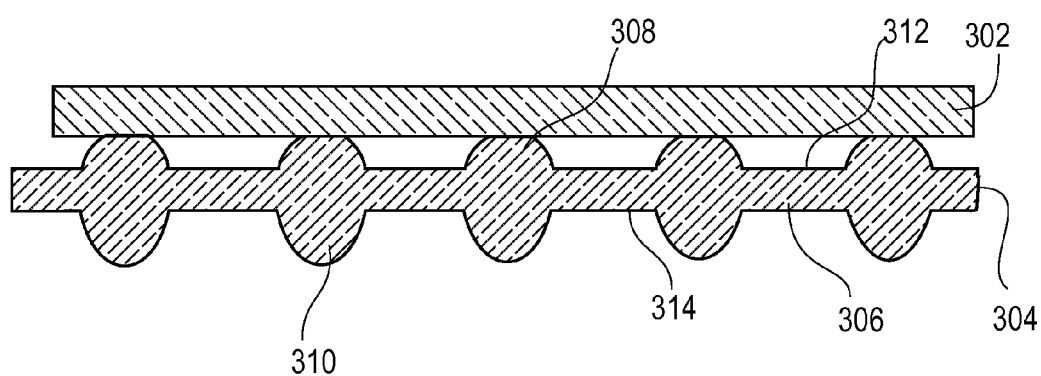

Once the optical element 304 is formed, the element 304 may be non-adhesively bonded to the waveguide body 302. However, because it is desired to accomplish such bonding using hot embossing or thermocompression without damaging the micro extraction features 310 on the face 314, a chuck 320 (FIG. 30) that partially or completely surrounds the extraction features 310 is used to apply the required pressure and heat to portions of the substrate 306 to effectuate the bonding process. Alternatively, a chuck 320a may be used comprising a plate having relief holes/recesses 321 (FIG. 30A) that align with the extraction features 310 and thereby facilitate application of pressure and/or heat to portions of the substrate 306 without damaging the extraction features 310.

Figure 32:
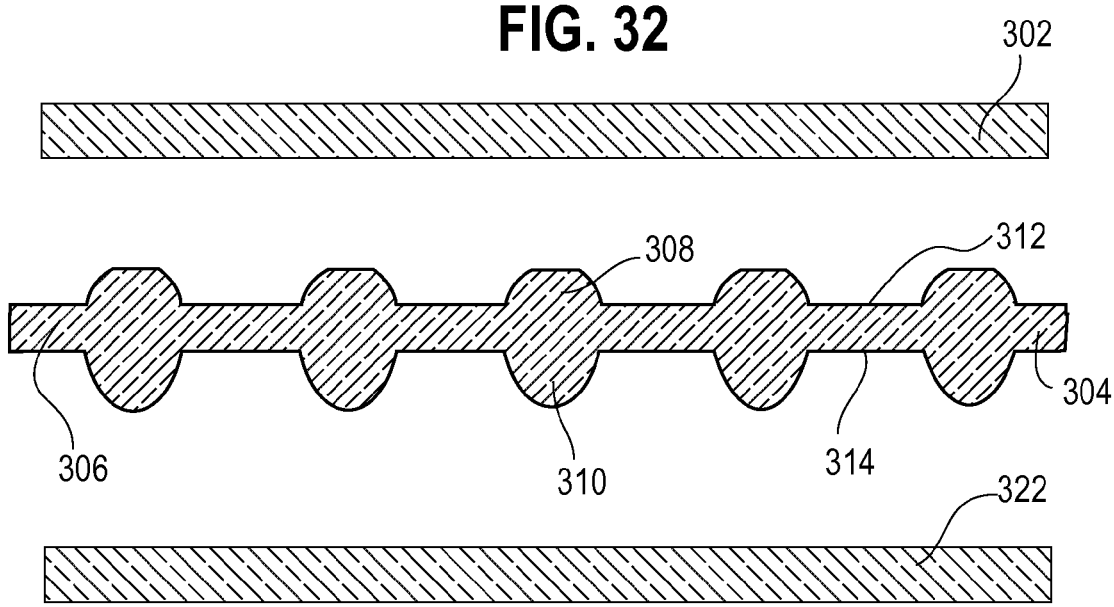
FIGS. 32-34 are fragmentary enlarged cross sectional views illustrating an alternative manufacturing process for the waveguide of FIGS. 29-31.
Figure 33:
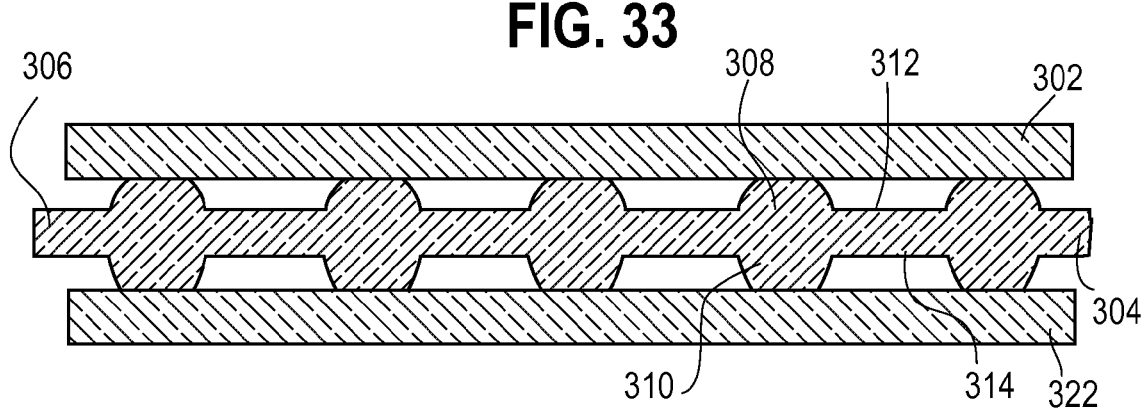
Figure 34:
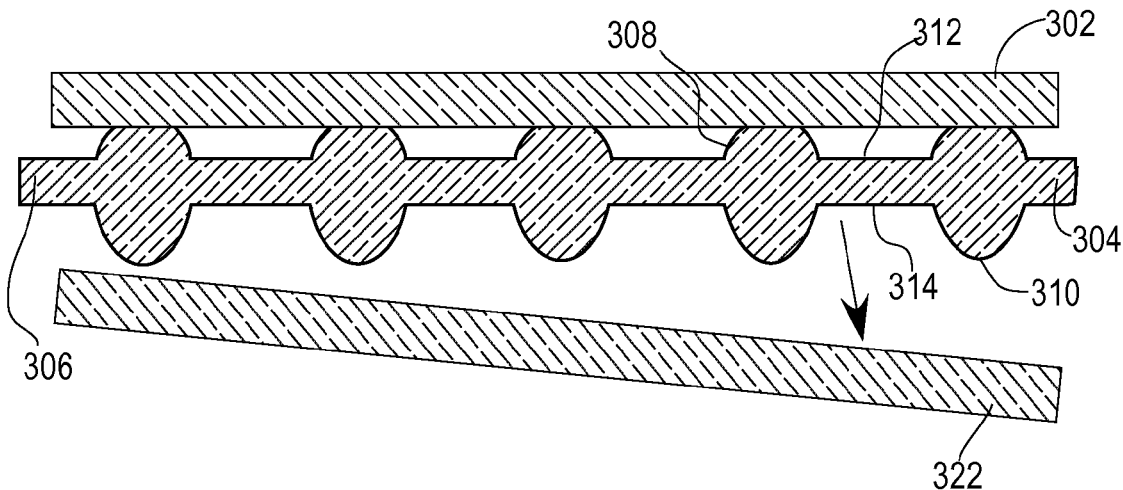

An alternative process seen in FIGS. 32-34 comprehends the use of a further substrate or layer 322 preferably (but not necessarily) non-adhesively bonded in the fashion described hereinabove to the extraction features 310 during manufacture (as seen in FIGS. 32 and 33). The further substrate 322 protects the extraction features 310 during non-adhesive bonding of the substrate 306 and extraction features 308, 310 to the waveguide body 302 as described previously. The further substrate 322 is stripped away as seen in FIG. 34 from the extraction features 310 after the bonding process is complete.

Further processes for creating a master or sub-master for hot embossing, thermocompression, or other methods of forming light extraction features 113 on a substrate 114 as described hereinabove involve the production of a sub-master element having relatively large features and employing a process to reduce the size of the features to obtain a master having microfeatures. For example, as seen in FIG. 35, a sub-master 400 is produced by embossing, patterning, or one or more other production processes by forming features in a shrinkable material (e.g., polystyrene film). The features 404 that are produced have a larger size, but are identically proportioned as compared to the microfeatures that are to be produced at a subsequent point in the overall production process. Once the sub-master is 400 produced the sub-master 400 is heated in a manner to cause the film to shrink to a smaller but proportionally identical three-dimensional shape to obtain a master 402 (FIG. 36) suitable for formation of the optical element 112. This three-dimensional isotropic scaling allows standard manufacturing techniques to be used for formation of features 404 that are thereafter shrunk down in size to microfeatures 406 using controlled heating and the specific material properties of a film. Very precise microfeatures 406 for optical materials, waveguides, mixed materials, and active optical products, such as optical films can be produced. Further, this process could be used to directly manufacture an optical film or to manufacture a master to be used for hot embossing or imprinting of optical films, as noted.

Figure 37:
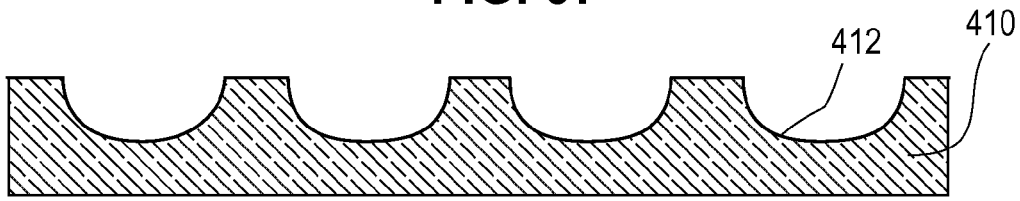
FIGS. 37-43 are fragmentary enlarged cross sectional views of a yet another manufacturing process for forming an optical element.

A further process involving the production of a sub-master 410 element having relatively large features 412 and using a process to reduce the size of the features 412 to obtain a master 416 having microfeatures 414 for extracting light from a waveguide is shown in FIGS. 37-43. As seen in FIG. 37, a sub-master 410 is produced by embossing, patterning, and/or one or more other production processes to form features in a polymeric or other material that is suitable for use in a metallic electroforming process. The features 412 that are produced have a larger size but are identically proportioned as compared to the microfeatures 414 that are to be produced at a subsequent point in the overall production process with the exception of the edge-to-edge spacing between the features 412. As should be evident from the discussion below, the manner in which the subsequent reduction in size of the features 412 is undertaken changes such spacing thereby requiring that the initial layout be arranged to compensate therefor.

Figure 38:
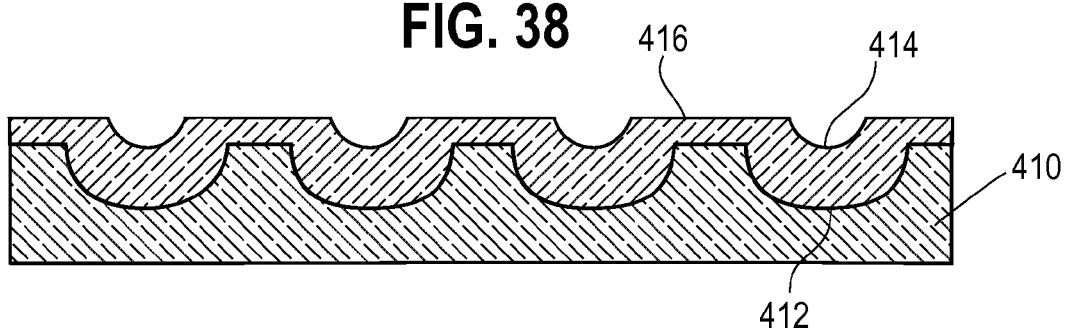
Figure 39:
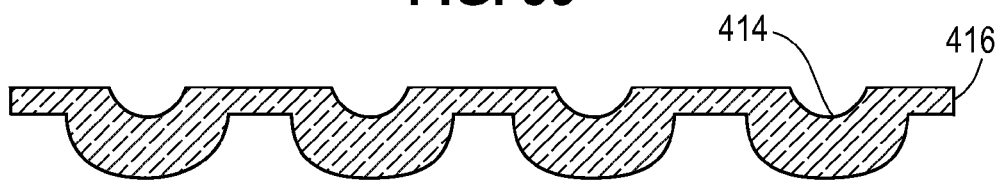
Figure 40:
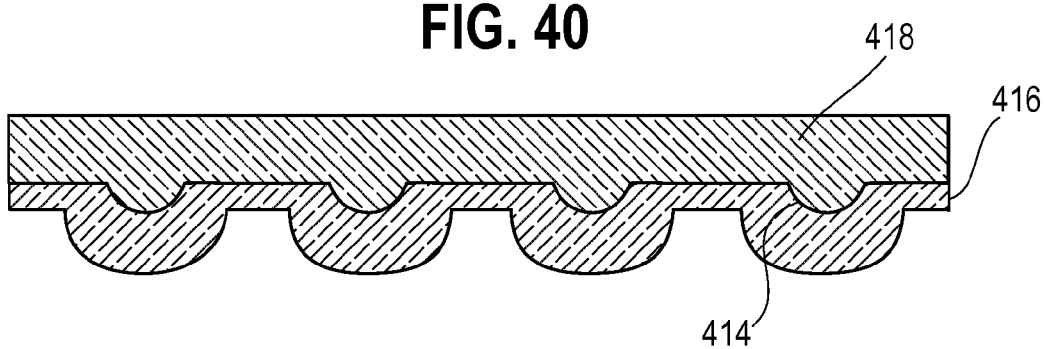
Figure 41:
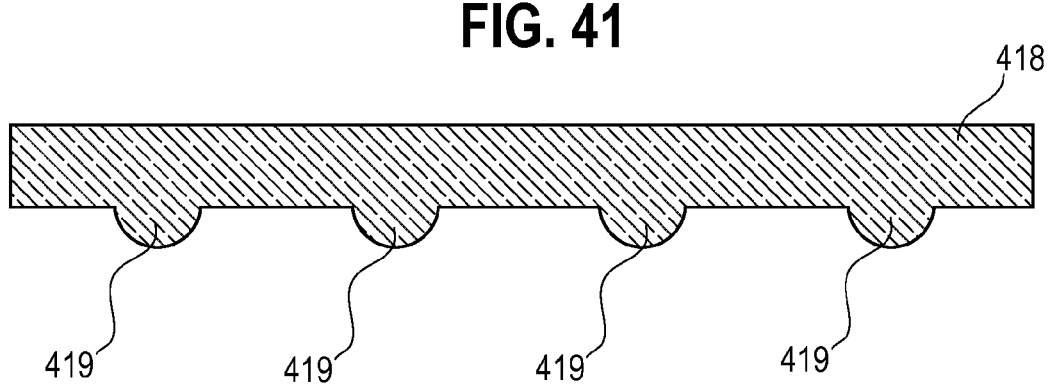
Figure 42:
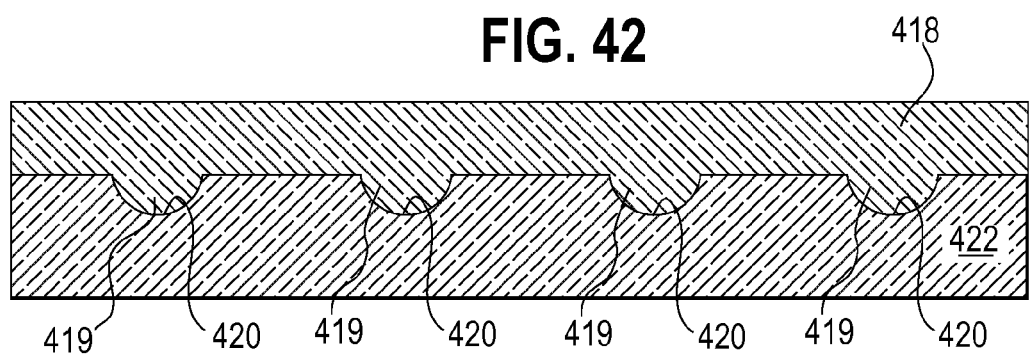
Figure 43:
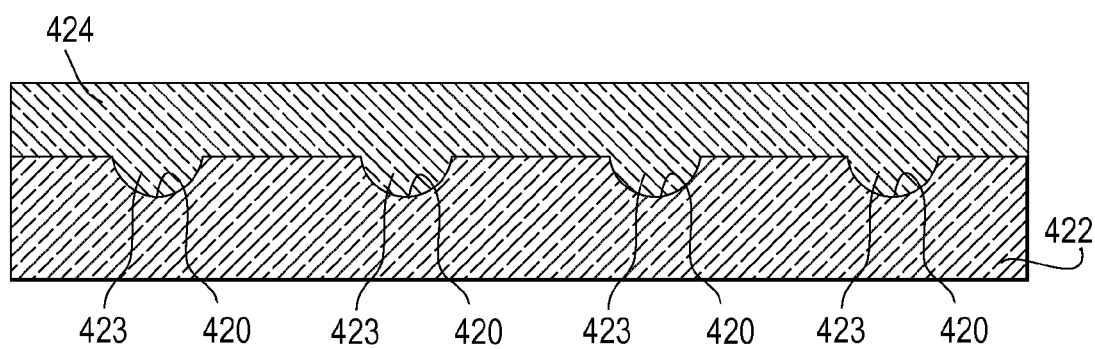

After the embossing and/or patterning and/or other process(es) are complete, the sub-master 410 is used to produce a master 416 in a metallic electroforming or electroplating process (FIGS. 38 and 39). The electroforming or electroplating is accomplished by electrodeposition on a base comprising the sub-master 410 and is undertaken to a defined thickness that reduces feature sizes to the desired sizes of the microfeatures 414 but maintains the proper proportions thereof. The microfeatures produced by electroforming or electroplating are then replicated directly (FIGS. 40 and 41) to produce an element 418 having a reduced size and shape of microfeatures 419. The resulting element 418 is thereafter used as an insert for hot embossing desired microfeatures 420 in a negative master 422 (FIG. 42) that can thereafter be used to form final microfeatures 423 in a hot embossed substrate 424 (FIG. 43). This process allows for standard manufacturing techniques to be used to form features 423 that are reduced in size using metallic electroforming and hot embossing.

INDUSTRIAL APPLICABILITY

The present disclosure comprehends the use of a bonding process that is adhesive-free to bond two structures permanently preferably using heat and pressure. Other non-adhesive bonding processes may be alternatively or additionally used. Such processes comprehend the use of layers made of materials that can be bonded using light or other electromagnetic radiation, such as UV-curable resins, or layers that are secured together by a bonding agent that does not use adhesives, bonding layers through the use of mechanical motion (e.g., ultrasonic vibration welding), heat welding (e.g., hot gas welding, hot plate welding, laser welding), induction welding, encapsulating materials in one layer with materials of another layer, chemically combining materials at an interface between layers, solvent welding (e.g., acetone, cyclohexane, 1,2-dichloroethane, methyl ethyl ketone, tetrahydrofuran), microscopically and/or macroscopically physically interspersing particles of one layer in another layer, providing a friction-fit, interference-fit, and/or suction fit between layers, securing layers together using one or more mechanical fasteners (e.g., staples, brads, rivets, structural members), or the like.

The process allows careful control of environments inside of optical components and optical materials and may allow for hermetic bonding of materials.

The processes for creating a master or sub-master for hot embossing, thermocompression, or other methods of forming light extraction features on a substrate as well as the electroforming or electroplating processes described hereinabove may be used in conjunction with or separately from the non-adhesive bonding processes contemplated by the present disclosure.

The processes disclosed herein are not limited to manufacturing of optical elements for luminaires. At least some of the disclosed embodiments may be used to form microstructures on or in plastic or polymeric materials generally, to form movable structures in optical materials, and/or to bond mixed optical materials. A still further application is the use of such a forming process to integrate optical MEMS into products.

At least some of the luminaires having optical elements as disclosed herein are particularly adapted for use in installations, such as, outdoor products and indoor products (e.g., downlights, troffers, a lay-in or drop-in application, a surface mount application onto a wall or ceiling, etc., and street lighting) preferably requiring a total luminaire output of at least about 100 lumens or greater, and, in some embodiments, a total luminaire output of at least about 1,000 lumens, and in other embodiments, a total lumen output of about 10,000 lumens to about 100,000 lumens. Further, the luminaires disclosed herein preferably have a color temperature of between about 2500 degrees Kelvin and about 6200 degrees Kelvin, and, in some embodiments, between about 2500 degrees Kelvin and about 5000 degrees Kelvin, and, in other embodiments, about 2700 or 3500 degrees Kelvin. Also, at least some of the luminaires disclosed herein preferably exhibit an efficacy of at least about 80 lumens per watt, more preferably at least about 100, and most preferably at least 120 lumens per watt. Additionally, at least some of the luminaires disclosed herein preferably exhibit an overall efficiency (i.e., light extracted out of the waveguide divided by light injected into the waveguide) of at least about 70 percent, preferably, at least about 80 percent, and most preferably, at least about 90 percent. A color rendition index (CRI) of at least about 80 is preferably attained by at least some of the luminaires disclosed herein, with a CRI of at least about 88 being more preferable, and at least about 90 being most preferable. Some luminaires exhibit a CRI of at least about 90 while maintaining a relatively high efficiency. Any desired particular output light distribution, such as a butterfly light distribution, could be achieved, including up and down light distributions or up only or down only distributions, etc.

When one uses a relatively small light source that emits into a broad (e.g., Lambertian) angular distribution (common for LED-based light sources), the conservation of etendue, as generally understood in the art, requires an optical system having a large emission area to achieve a narrow (collimated) angular light distribution. In the case of parabolic reflectors, a large optic is thus generally required to achieve high levels of collimation. In order to achieve a large emission area in a more compact design, the prior art has relied on the use of Fresnel lenses, which utilize refractive optical surfaces to direct and collimate the light. Fresnel lenses, however, are generally planar in nature, and are therefore not well suited to re-directing high-angle light emitted by the source, leading to a loss in optical efficiency. In contrast, in the present luminaire using the optical elements disclosed herein, light is coupled into the optic, where primarily TIR is used for re-direction and collimation. This coupling allows the full range of angular emission from the source, including high-angle light, to be re-directed and collimated, resulting in higher optical efficiency in a more compact form factor.

In at least some of the present embodiments incorporating the optical elements disclosed herein, the distribution and direction of light within the optical member is better known, and hence, light is controlled and extracted in a more controlled fashion.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure.

We claim:

1. An optical element, comprising:
an optically transparent substrate;
first and second pluralities of light extraction features of optically transparent material that exhibit total internal reflection respectively disposed on opposing first and second sides of the substrate; and
a waveguide body wherein the light extraction features of one of the first and second pluralities secure the substrate to the waveguide body;
wherein the first and second pluralities of light extraction features are non-adhesively bonded to the optically transparent substrate;
wherein the light extraction features of one of the first and second pluralities are non-adhesively bonded to the waveguide body; and
wherein the optical element comprises non-adhesive bonds on at least three surfaces thereof.

2. The optical element of claim 1, wherein the light extracting features are disposed in one of a non-random arrangement and a random arrangement on each of the opposing sides of the substrate.

3. The optical element of claim 1, wherein the light extraction features are bonded to the sides of the substrate using thermal compression.

4. The optical element of claim 1, wherein the light extraction features are hot embossed to the sides of the substrate.

5. The optical element of claim 1, wherein the light extraction features are formed on the sides of the substrate using a process comprising the steps of producing a submaster element comprising features that are larger than microfeatures disposed on a master and reducing sizes of the features to obtain the master comprising the microfeatures.

6. The optical element of claim 5, wherein the sizes of the features are reduced by exposing the sub-master element to heat.

7. The optical element of claim 6, wherein the sizes of the features are reduced by electroforming the sub-master.

8. The optical element of claim 1, wherein a bonding chuck at least partially surrounds a portion of the light extraction features during securing of the optical element to a waveguide body.

9. The optical element of claim 1, wherein ends of a first portion of light extraction features are initially disposed on a surface of a further substrate and the further substrate is removed from the ends of the first portion of light extraction features after a second portion of light extraction features are bonded to the waveguide body.

* * * * *